(12) United States Patent
Sasaki

(10) Patent No.: US 10,938,060 B2
(45) Date of Patent: Mar. 2, 2021

(54) SOLID ELECTROLYTE MATERIAL INCLUDING SULFIDE LAYER AND OXIDE LAYER, AND BATTERY INCLUDING THE SOLID ELECTROLYTE MATERIAL

(71) Applicant: Panasonic Intellectual Property Management Co., Ltd., Osaka (JP)

(72) Inventor: Izuru Sasaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 241 days.

(21) Appl. No.: 15/942,576

(22) Filed: Apr. 2, 2018

(65) Prior Publication Data

US 2018/0316057 A1    Nov. 1, 2018

(30) Foreign Application Priority Data

Apr. 27, 2017  (JP) .............................. JP2017-088577

(51) Int. Cl.
| | |
|---|---|
| *H01M 10/0562* | (2010.01) |
| *H01M 4/525* | (2010.01) |
| *H01M 4/36* | (2006.01) |
| *H01M 10/0525* | (2010.01) |
| *H01M 4/62* | (2006.01) |
| *H01M 4/485* | (2010.01) |

(52) U.S. Cl.
CPC ....... *H01M 10/0562* (2013.01); *H01M 4/366* (2013.01); *H01M 4/485* (2013.01); *H01M 4/525* (2013.01); *H01M 4/625* (2013.01); *H01M 10/0525* (2013.01); *H01M 2300/0068* (2013.01); *H01M 2300/0071* (2013.01)

(58) Field of Classification Search
None
See application file for complete search history.

(56) References Cited

U.S. PATENT DOCUMENTS

| | | | |
|---|---|---|---|
| 2012/0301796 A1 | 11/2012 | Ohtomo et al. | |
| 2014/0287324 A1* | 9/2014 | Tsuchida | H01M 4/366 |
| | | | 429/304 |
| 2017/0331149 A1* | 11/2017 | Sasaki | H01M 4/131 |

FOREIGN PATENT DOCUMENTS

| | | |
|---|---|---|
| JP | 2011-129312 | 6/2011 |
| JP | 2012-094445 | 5/2012 |
| JP | 2012094445 A * | 5/2012 |

OTHER PUBLICATIONS

Machine translation of JP 2012-094445 A (Year: 2012).*

* cited by examiner

*Primary Examiner* — Robert S Carrico
(74) *Attorney, Agent, or Firm* — McDermott Will and Emery LLP

(57) ABSTRACT

A solid electrolyte material includes: a sulfide layer containing lithium atoms and sulfur atoms; and an oxide layer covering the sulfide layer, the oxide layer containing lithium atoms and oxygen atoms. The solid electrolyte material satisfies $0.51 \leq x$ and $x/y \geq 1.53$, where x is a first ratio of the number of the oxygen atoms to the number of the lithium atoms at a depth 4 nm of the solid electrolyte material from the surface of the oxide layer; and y is a second ratio of the number of the oxygen atoms to the number of the lithium atoms at a depth 100 nm of the solid electrolyte material from the surface of the oxide layer.

19 Claims, 10 Drawing Sheets

SOLID ELECTROLYTE MATERIAL INCLUDING SULFIDE LAYER AND OXIDE LAYER, AND BATTERY INCLUDING THE SOLID ELECTROLYTE MATERIAL

BACKGROUND

1. Technical Field

The present disclosure relates to a solid electrolyte material including a sulfide and an electrode material, a positive electrode, and a battery that include the solid electrolyte material.

2. Description of the Related Art

Lithium secondary batteries include a positive electrode, a negative electrode, and an electrolyte layer interposed therebetween. The electrolyte layer includes a nonaqueous electrolyte solution or a solid electrolyte. Since common electrolyte solutions are combustible, a lithium secondary battery that includes an electrolyte solution requires a system for maintaining security. In contrast, since solid electrolytes are incombustible, the use of a solid electrolyte simplifies the above system. Batteries that include a solid electrolyte are referred to as "solid-state batteries".

Solid electrolytes are roughly classified into organic solid electrolytes and inorganic solid electrolytes. The organic solid electrolytes are referred to also as "polymer solid electrolytes". Since the ionic conductivities of organic solid electrolytes at room temperature are about $10^{-6}$ S/cm, it is difficult to drive a solid-state battery that includes an organic solid electrolyte at room temperature. Examples of inorganic solid electrolytes include an oxide solid electrolyte and a sulfide solid electrolyte.

Japanese Unexamined Patent Application Publication No. 2011-129312 discloses a sulfide solid electrolyte material that includes a $Li_2O$ phase. Japanese Unexamined Patent Application Publication No. 2012-94445 discloses sulfide solid electrolyte particles that include an oxide layer.

SUMMARY

In one general aspect, the techniques disclosed here feature a solid electrolyte material including: a sulfide layer containing lithium atoms and sulfur atoms; and an oxide layer covering the sulfide layer, the oxide layer containing lithium atoms and oxygen atoms. The solid electrolyte material satisfies $0.51 \leq x$ and $x/y \geq 1.53$, where x is a first ratio of the number of the oxygen atoms to the number of the lithium atoms at a depth 4 nm of the solid electrolyte material from a surface of the oxide layer, which is determined by an XPS analysis; and y is a second ratio of the number of the oxygen atoms to the number of the lithium atoms at a depth 100 nm of the solid electrolyte material from the surface of the oxide layer, which is determined by the XPS analysis.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
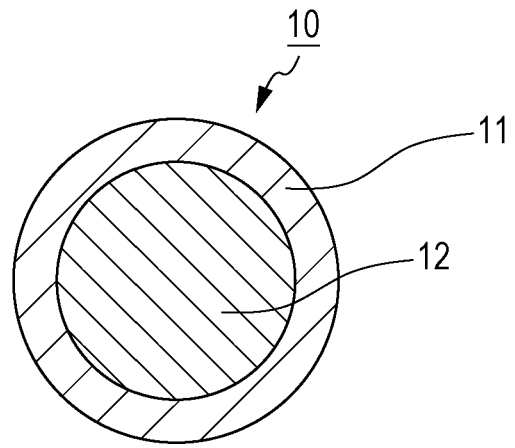
FIG. 1 is a schematic cross-sectional view of a sulfide solid electrolyte material according to Embodiment 1.

Underlying Knowledge Forming Basis of the Present Disclosure

In a solid-state lithium secondary battery that includes a sulfide solid electrolyte material, the sulfide solid electrolyte material is unstable to high and low potentials and particularly unstable to high potentials. At the contact interface between such a sulfide solid electrolyte material and an active material that is subjected to a high potential, weak lithium-sulfur bonds become broken and, consequently, lithium is extracted from the sulfide solid electrolyte material. The extraction of lithium from the sulfide solid electrolyte material results in a change in the structure of the sulfide solid electrolyte material, which reduces the lithium ion conductivity of the sulfide solid electrolyte material. This leads to the degradation in the discharge characteristic of the battery.

One of the methods for reducing the extraction of lithium from the sulfide solid electrolyte material is to introduce lithium-oxygen bonds, which have a stronger bonding strength than lithium-sulfur bonds, to the sulfide solid electrolyte material. Reducing the extraction of lithium from the sulfide solid electrolyte material enhances the stability of the sulfide solid electrolyte material at high and low potentials.

It is possible to uniformly introduce lithium-oxygen bonds to a sulfide solid electrolyte material by mixing the sulfide solid electrolyte material with $Li_2O$ by mechanical milling as disclosed in Japanese Unexamined Patent Application Publication No. 2011-129312. However, in the surface layers of particles of a sulfide solid electrolyte material prepared by the above method, the proportion of the number of lithium-oxygen bonds to the number of lithium-sulfur bonds is small. Therefore, it is not possible to reduce the extraction of lithium from the sulfide solid electrolyte material by a sufficient degree. Increasing the amount of $Li_2O$ added to the sulfide solid electrolyte material in order to increase the proportion of the number of lithium-oxygen bonds in the surface layers of particles of the sulfide solid electrolyte material also increases the number of lithium-oxygen bonds included inside the particles of the sulfide solid electrolyte material. The increase in the number of lithium-oxygen bonds included inside of particles of the sulfide solid electrolyte material may reduce the lithium ion conductivity inside the particles of the sulfide solid electrolyte material and, consequently, degrade the discharge characteristic of the battery.

In Japanese Unexamined Patent Application Publication No. 2011-129312, no mention is made of the proportion of the number of lithium-oxygen bonds, which play an important role for reducing the extraction of lithium from the sulfide solid electrolyte material.

A sulfide solid electrolyte material according to a first aspect of the present disclosure includes a sulfide layer including a sulfide material, and an oxide layer including an oxide of the sulfide material, the oxide layer being disposed on a surface of the sulfide layer, the sulfide solid electrolyte material satisfying $0.51 \leq x$ and $x/y \geq 1.53$, wherein x is the ratio of the number of oxygen atoms to the number of lithium atoms, the ratio being determined by an XPS analysis at a depth 4 nm from a surface of the oxide layer, and wherein y is the ratio of the number of the oxygen atoms to the number of the lithium atoms, the ratio being determined by the XPS analysis at a depth 100 nm from the surface of the oxide layer.

The oxygen/lithium element ratio in the surface layer of the sulfide solid electrolyte material according to the first aspect is sufficiently high. In other words, the proportion of the number of lithium-oxygen bonds in the surface layer of the sulfide solid electrolyte material is sufficiently large. This reduces a change in the structure of the sulfide solid electrolyte material which occurs as a result of the extraction of lithium and limits a reduction in lithium ion conductivity which occurs as a result of the extraction of lithium. Accordingly, the discharge characteristic of a battery that includes the sulfide solid electrolyte material may be enhanced.

According to a second aspect of the present disclosure, for example, the sulfide solid electrolyte material according to the first aspect satisfies $0.88 \leq x$. In the sulfide solid electrolyte material according to the second aspect, the extraction of lithium from the surface layer may be reduced by a further sufficient degree. As a result, the discharge characteristic of a battery that includes the sulfide solid electrolyte material may be further enhanced.

According to a third aspect of the present disclosure, for example, the sulfide material included in the sulfide solid electrolyte material according to the first or second aspect is $Li_2S—P_2S_5$. Adding $Li_2S—P_2S_5$ to the sulfide layer of the sulfide solid electrolyte material may further enhance the discharge characteristic of the battery.

A battery according to a fourth aspect of the present disclosure includes a positive electrode;

a negative electrode; and an electrolyte layer interposed between the positive electrode and the negative electrode, wherein at least one selected from the positive electrode, the negative electrode, and the electrolyte layer includes the sulfide solid electrolyte material according to any one of the first to third aspects.

The battery according to the fourth aspect may have an enhanced discharge characteristic compared with batteries that do not include the sulfide solid electrolyte material.

According to a fifth aspect of the present disclosure, for example, at least one selected from the positive electrode and the negative electrode of the battery according to the fourth aspect includes the sulfide solid electrolyte material. In the battery according to the fifth aspect, the extraction of lithium at the contact interface between the sulfide solid electrolyte material and a positive electrode active material may be reduced. In another case, the extraction of lithium at the contact interface between the sulfide solid electrolyte material and a negative electrode active material may be reduced. Consequently, the discharge characteristic of the battery may be enhanced.

According to a sixth aspect of the present disclosure, for example, the positive electrode of the battery according to the fifth aspect includes the sulfide solid electrolyte material and a positive electrode active material. In the battery according to the sixth aspect, the extraction of lithium at the contact interface between the sulfide solid electrolyte material and the positive electrode active material may be reduced in the positive electrode, which is likely to be significantly affected by the extraction of lithium. Consequently, the discharge characteristic of the battery may be further enhanced.

According to a seventh aspect of the present disclosure, for example, the positive electrode active material of the battery according to the sixth aspect includes at least one selected from lithium-nickel-cobalt-aluminum oxide and lithium-cobalt oxide. The above positive electrode active materials may increase the energy density of the battery. The lithium-nickel-cobalt-aluminum oxide is represented by, for example, $Li(Ni_xCo_yAl_z)O_2$ (where $x>0$, $y>0$, $z>0$, $x+y+z=1$). For example, the lithium-nickel-cobalt-aluminum oxide may be $LiNi_{0.8}Co_{0.15}Al_{0.05}O_2$. The lithium-cobalt oxide is represented by, for example, $LiCoO_2$.

A positive electrode according to an eighth aspect of the present disclosure includes the sulfide solid electrolyte material according to any one of the first to third aspects;

a positive electrode active material; and a conductive additive.

In the positive electrode according to the eighth aspect, since the sulfide solid electrolyte material includes a surface layer including lithium-oxygen bonds that are stronger than lithium-sulfur bonds, the extraction of lithium from the sulfide solid electrolyte material is reduced, that is, the oxidation of the sulfide solid electrolyte material is reduced. The positive electrode including the positive electrode active material, the sulfide solid electrolyte material, and the conductive additive has a sufficiently large charge capacity. The oxidation reaction at the interface between the sulfide solid electrolyte material and the conductive additive is suppressed. As a result, the positive electrode may have a high charge/discharge efficiency.

According to a ninth aspect of the present disclosure, for example, the conductive additive of the positive electrode according to the eighth aspect includes acetylene black. Using an acetylene black powder as a conductive additive may increase the charge characteristic of the battery and reduce the production costs of the battery.

A battery according to a tenth aspect of the present disclosure includes the positive electrode according to the eighth or ninth aspect;

a negative electrode; and an electrolyte layer interposed between the positive electrode and the negative electrode.

The battery according to the tenth aspect may have a sufficiently large charge capacity.

An electrode material according to an eleventh aspect of the present disclosure includes the sulfide solid electrolyte material according to any one of the first to third aspects;

an electrode active material particle; and a coating layer including a coating material, the coating layer being disposed on a surface of the electrode active material particle.

In the electrode material according to the eleventh aspect, a reduction in potential caused as a result of increases in metal ion concentration at the interfaces between the layers constituting the electrode material may be limited. Accordingly, the likelihood of discharge of the battery being terminated at an early stage as a result of the reduction in potential may be reduced. This allows the battery to be discharged to a sufficient degree and increases the charge/discharge efficiency of the battery.

According to a twelfth aspect of the present disclosure, for example, the coating material included in the electrode material according to the eleventh aspect is an oxide solid electrolyte. Since an oxide solid electrolyte is highly stable at high potentials, using an oxide solid electrolyte as a coating material may further increase the charge/discharge efficiency of the battery.

According to a thirteenth aspect of the present disclosure, for example, the coating material included in the electrode material according to the eleventh aspect is lithium-niobium oxide. Since lithium-niobium oxide has high electrochemical stability, using lithium-niobium oxide as a coating material may further increase the charge/discharge efficiency of the battery. The lithium-niobium oxide is represented by, for example, $LiNbO_3$.

According to a fourteenth aspect of the present disclosure, for example, the electrode active material included in the electrode material according to any one of the eleventh to thirteenth aspects includes lithium-nickel-cobalt-aluminum oxide. Using lithium-nickel-cobalt-aluminum oxide as an electrode active material enables the production of a battery having a high energy density.

A battery according to a fifteenth aspect of the present disclosure includes a positive electrode;

a negative electrode; and an electrolyte layer interposed between the positive electrode and the negative electrode, wherein at least one selected from the positive electrode and the negative electrode includes the electrode material according to the eleventh to fourteenth aspects.

In the battery according to the fifteenth aspect, the retention of metal ions due to a sudden change in transfer rate may be reduced in the positive electrode and/or the negative electrode. Furthermore, increases in metal ion concentration at the interfaces between the layers constituting the electrode material may be limited. Consequently, the charge/discharge efficiency of the battery may be increased.

According to a sixteenth aspect of the present disclosure, for example, the electrode active material included in the electrode material included in the battery according to the fifteenth aspect is a positive electrode active material and the positive electrode includes the electrode material. In the battery according to the sixteenth aspect, a reduction in potential due to increases in metal ion concentration at the interfaces between the layers constituting the electrode material may be limited. Accordingly, the likelihood of discharge of the battery being terminated at an early stage as a result of the reduction in potential may be reduced. This allows the battery to be discharged to a sufficient degree and increases the charge/discharge efficiency of the battery.

Embodiments of the present disclosure are described below with reference to the attached drawings. The present disclosure is not limited by the following embodiments. The compositional formulae of the various substances described in the present disclosure are merely examples; the compositional ratios of the substances are not limited to the specific compositional ratios (e.g., stoichiometric compositions) represented by the composition formulae and may be deviated from the specific compositional ratios by a certain degree.

Embodiment 1

A sulfide solid electrolyte material 10 according to Embodiment 1 includes an oxide layer 11 and a sulfide layer 12 as illustrated in FIG. 1. The sulfide layer 12 is a layer including a sulfide material. The oxide layer 11 is a layer including an oxide of the sulfide material included in the sulfide layer 12. The oxide layer 11 is disposed on the surface of the sulfide layer 12. The sulfide solid electrolyte material 10 according to Embodiment 1 has a core shell structure, in which the sulfide layer 12 serves as a core and the oxide layer 11 serves as a shell. Hereinafter, the sulfide solid electrolyte material 10 is referred to simply as "electrolyte material 10".

The electrolyte material 10 satisfies $0.51 \leq x$ and $x/y \geq 1.53$, where x is the ratio (B/A) of the number of oxygen atoms (B) to the number of lithium atoms (A) which is determined by X-ray photoelectron spectroscopy (XPS) analysis at a depth 4 nm from the surface of the oxide layer 11, and y is the ratio (b/a) of the number of oxygen atoms (b) to the number of lithium atoms (a) which is determined by XPS analysis at a depth 100 nm from the surface of the oxide layer 11. In Embodiment 1, the surface of the oxide layer 11 is the surface of the electrolyte material 10. Hereinafter, the ratios (B/A) and (b/a) are referred to as "oxygen/lithium element ratio".

When the electrolyte material 10 satisfies $0.51 \leq x$, the oxygen/lithium element ratio in the surface layer of the electrolyte material 10 is sufficiently high. In other words, the proportion of the number of lithium-oxygen bonds in the surface layer of the electrolyte material 10 is sufficiently large. Oxygen forms a strong bond with lithium. In the case where the proportion of the number of lithium-oxygen bonds is sufficiently large, extraction of lithium from the surface layer of the electrolyte material 10 may be sufficiently reduced even when the electrolyte material 10 is subjected to a high potential upon being brought into contact with an active material. In turn, a change in the structure of the electrolyte material 10 which may be caused as a result of the extraction of lithium and a reduction in lithium ion conductivity which may be caused as a result of the extraction of lithium may be limited. Consequently, the discharge characteristic of a battery that includes the electrolyte material 10 may be enhanced.

The electrolyte material 10 may satisfy $0.88 \leq x$. In such a case, the extraction of lithium from the surface layer of the electrolyte material 10 may be reduced by a further sufficient degree. As a result, the discharge characteristic of a battery that includes the electrolyte material 10 may be further enhanced.

The ratio x may be less than 2. When the ratio x falls within the adequate range, the ionic conductivity of the surface layer of the electrolyte material 10 may be maintained at a sufficient level. If the ratio x is 2 or more, the electrolyte material 10 may disadvantageously include an excessive amount of bonds including oxygen which are other than lithium-oxygen bonds, which are required for reducing the extraction of lithium. Examples of the other bonds include a double bond between a cationic element other than lithium (e.g., phosphorous, silicon, germanium, or boron) with oxygen; and a crosslinking bond having a structure of cationic element-oxygen-cationic element. If the amount of the above bonds included in the electrolyte material 10 is excessively large, the ionic conductivity of the surface layer of the electrolyte material 10 may become insufficient.

The ratio y may be 0 or more and 1.0 or less. When the ratio y is 1.0 or less, the electric conductivity of the sulfide layer 12 may be increased.

When the electrolyte material 10 satisfies x/y≥1.53, the oxygen/lithium element ratio in a portion of the oxide layer 11 which is in the vicinity of the contact interface between the oxide layer 11 and the sulfide layer 12 is sufficiently low. In other words, the proportion of the number of lithium-oxygen bonds in the portion of the oxide layer 11 which is in the vicinity of the contact interface is sufficiently small. When the proportion of the number of strong lithium-oxygen bonds is small and the proportion of the number of weak lithium-sulfur bonds is large, the electrolyte material 10 has a high lithium ion conductivity. Accordingly, the discharge characteristic of a battery that includes the electrolyte material 10 may be further enhanced.

When the electrolyte material 10 satisfies x/y≥1.53, the oxygen/lithium element ratio in the portion of the oxide layer 11 which is in the vicinity of the contact interface between the oxide layer 11 and the sulfide layer 12 is close to the oxygen/lithium element ratio in the sulfide layer 12. In such a case, the bonding strength between the oxide layer 11 and the sulfide layer 12 is increased, and an interface having high adhesion is formed between the oxide layer 11 and the sulfide layer 12. As a result, the discharge characteristic of a battery that includes the electrolyte material 10 may be further enhanced. The oxygen/lithium element ratio may change over a region of the electrolyte material 10 which includes the contact interface in a continuous manner.

Examples of the sulfide material included in the sulfide layer 12 include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Optionally, LiX, $Li_2O$, $MO_q$, $Li_pMO_q$, or the like may be added to the sulfide material, where X represents F, Cl, Br, or I; M represents P, Si, Ge, B, Al, Ga, In, Fe, or Zn; and p and q are natural numbers. In the case where, for example, LiX is added to $Li_2S$—$P_2S_5$, $Li_2S$, $P_2S_5$, and LiX are reacted with one another by heating, mechanical milling, or the like to form a compound. The addition of the above material provides various advantages such as an increase in electric conductivity, enhancement in chemical stability, and a reduction in interface resistance.

In the case where the sulfide material is $80Li_2S$-$20P_2S_5$, the ratio x may be 1.57 or less. For example, when all of the sulfur atoms included in $80Li_2S$-$20P_2S_5$ are replaced with oxygen atoms, the ratio x is 1.57.

The sulfide material may be $Li_2S$—$P_2S_5$. $Li_2S$—$P_2S_5$ has high electrochemical stability and a high ionic conductivity. Adding $Li_2S$—$P_2S_5$ to the sulfide layer 12 of the electrolyte material 10 further enhances the discharge characteristic of a battery that includes the electrolyte material 10.

The oxygen/lithium element ratio inside the sulfide layer 12 may be sufficiently low and uniform. In such a case, the electrolyte material 10 has a further high ionic conductivity.

The oxide layer 11 may be a layer formed by the oxidation of the sulfide material included in the sulfide layer 12. When the sulfide layer 12 includes a sulfide material that is $Li_2S$—$P_2S_5$, the oxide layer 11 includes an oxide produced by the oxidation of $Li_2S$—$P_2S_5$. The term "oxidation of the sulfide material included in the sulfide layer 12" used herein refers to the replacement of some or all of the sulfur bonds included in the sulfide material included in the sulfide layer 12 with oxygen bonds. When the sulfide layer 12 includes a sulfide material that is $Li_2S$—$P_2S_5$, the sulfide material primarily includes a $PS_4^{3-}$ structure constituted by one phosphorus atom and four sulfur atoms bonded to the phosphorus atom. In such a case, the oxide included in the oxide layer 11 includes at least one structure formed by replacing some or all of the sulfur bonds included in $PS_4^{3-}$ with oxygen bonds. Examples of such a structure include $PS_3O^{3-}$, $PS_2O_2^{3-}$, $PSO_3^{3-}$, and $PO_4^{3-}$.

The oxygen/lithium element ratio may decrease in a continuous or stepwise manner in the direction from the surface of the oxide layer 11 to the contact interface between the oxide layer 11 and the sulfide layer 12. In such a case, a sudden change in the composition of the oxide layer 11 may be avoided and, consequently, the bonding strength of the inside of the oxide layer 11 may be increased. As a result, even when the oxide layer 11 includes a sublayer having a high oxygen concentration and a sublayer having a low oxygen concentration, an interface having high adhesion may be created between the sublayer having a high oxygen concentration and the sublayer having a low oxygen concentration.

The shape of the electrolyte material 10 is not limited and may be, for example, an acicular shape, a scale-like shape, a spherical shape, or an ellipsoidal shape. The electrolyte material 10 may be provided in the form of particles. In the case where the electrolyte material 10 is particulate, (e.g., spherical), the median diameter (d50) of the electrolyte material 10 may be 0.1 μm or more and 100 μm or less. When the electrolyte material 10 has the adequate size, the proportion of the amount (e.g., volume) of oxide layer 11 in the electrolyte material 10 may fall within an adequate range and, consequently, the electrolyte material 10 has a sufficiently high ionic conductivity. When the electrolyte material 10 has the adequate size, the electrolyte material 10 and other materials, such as active materials and conductive additives, can be dispersed in a suitable manner in the positive or negative electrode. This enhances the discharge characteristic of a battery that includes the electrolyte material 10.

The median diameter of particles of the electrolyte material 10 may be 0.5 μm or more and 10 μm or less. In such a case, the ionic conductivity of the electrolyte material 10 may be further increased. Furthermore, the degree of dispersion of the electrolyte material 10 and the other materials, such as the active material, may be further increased.

The median diameter of particles of the electrolyte material 10 may be smaller than that of particles of the active material. In such a case, the degree of dispersion of the electrolyte material 10 and the other materials, such as the active material, may be further increased.

The median diameter of particles is the particle size (d50) at which, in a particle size distribution determined with a laser diffraction particle size analyzer or the like, the cumulative volume curve crosses 50% cumulative volume.

In the case where the electrolyte material 10 is particulate (e.g., spherical), the thickness of the oxide layer 11 is, for example, 1 nm or more and 300 nm or less. When the thickness of the oxide layer 11 falls within the above range, the extraction of lithium may be reduced by a sufficient degree. Furthermore, the proportion of the amount of oxide layer 11 in the electrolyte material 10 falls within an adequate range. As a result, the electrolyte material 10 may have a sufficiently high ionic conductivity.

The thickness of the oxide layer 11 may be 5 nm or more and 50 nm or less. When the thickness of the oxide layer 11 is 5 nm or more, extraction of lithium from the surface layer of the electrolyte material 10 may be reduced by a further sufficient degree. When the thickness of the oxide layer 11 is 50 nm or less, the proportion of the amount of oxide layer 11 in the electrolyte material 10 is relatively small. In such a case, the electrolyte material 10 may have a sufficiently high ionic conductivity.

The oxide layer 11 may cover the entire surface of the sulfide layer 12. Alternatively, the oxide layer 11 may cover only a portion of the surface of the sulfide layer 12.

The oxygen/lithium element ratios x and y are determined by the following method. The electrolyte material 10 is etched to a depth 4 nm (in terms of $SiO_2$ sputtering rate) from the surface by ion sputtering. Examples of ions used for sputtering include argon ion and $C_{60}$ fullerene. After the electrolyte material 10 has been etched to the 4-nm depth position, the ion irradiation is stopped and an XPS analysis is conducted. The ratio x at the 4-nm depth position is determined from the resulting XPS spectrum. Subsequently, the ion irradiation is restarted, and the electrolyte material 10 is etched to a depth 100 nm (in terms of $SiO_2$ sputtering rate) from the surface. After the electrolyte material 10 has been etched to the 100-nm depth position, the ion irradiation is stopped and an XPS analysis is conducted. The ratio y at the 100-nm depth position is determined from the resulting XPS spectrum. In the case where the electrolyte material 10 is particulate, a powder of the electrolyte material 10 may be directly subjected to the XPS analysis. Alternatively, the powder of the electrolyte material 10 may be pressed to form pellets and the pellets may be subjected to the XPS analysis.

The thickness of the oxide layer 11 can be determined by an XPS analysis. Hereinafter, the oxygen/lithium element ratio in the sulfide layer 12 is represented by z. An XPS spectrum is obtained at predetermined intervals (e.g., intervals of 10 nm) by performing ion sputtering and conducting an XPS analysis in an alternating manner. The oxygen/lithium element ratio is determined at each of the positions. The depth at which the oxygen/lithium element ratio is substantially equal to $(x+3z)/4$ may be considered to be the thickness of the oxide layer 11. The ratio x is the oxygen/lithium element ratio at the 4-nm depth position. The ratio z can be determined by an XPS analysis. For example, when ion sputtering is performed for a sufficiently long period of time, the oxygen/lithium element ratio decreases asymptotically to a certain value. The asymptotic value is considered to be the ratio z.

Method for Producing Sulfide Solid Electrolyte Material

The electrolyte material 10 may be produced by the method described below. Particles of an electrolyte material composed of the sulfide layer 12 are used as a precursor. The precursor is placed in an electric furnace with a controlled oxygen partial pressure. The precursor is heated at a predetermined temperature for a predetermined time to be oxidized. As a result, each of the surface layers of the particles of the precursor is oxidized to form an oxide layer 11. Hereby, an electrolyte material 10 is produced.

Oxygen gas may be used for controlling the oxygen partial pressure. Alternatively, an oxidizing agent that releases oxygen at a predetermined temperature may be used as an oxygen source. The type of the oxidizing agent is not limited and may be an inorganic oxidizing agent, such as $KMnO_4$. The thickness of the oxide layer 11 and the oxygen/lithium element ratio in the oxide layer 11 may be adjusted by changing, for example, the amount of the oxidizing agent used, the position at which the oxidizing agent is disposed, and the degree at which the oxidizing agent is charged.

The electric furnace used for the above heat treatment may be hermetically sealed. In such a case, the likelihood of oxygen gas present outside the electric furnace entering the electric furnace can be reduced. The proportion of the amount of oxygen contained in the electric furnace to the weight of the precursor may be 0.1 cc/mg or less. Controlling the content of oxygen in the electric furnace in the above manner prevents excessive oxidation of the precursor and enables only portions of the particles of the precursor which are in the vicinities of the surfaces to be oxidized with efficiency.

Other embodiments of the present disclosure is described below. In each of the embodiments below, components common to Embodiment 1 are denoted by the same reference numerals as in Embodiment 1, and the description of the components may be omitted. The descriptions of the embodiments may be applied to one another unless technical contradiction arises. The embodiments may be combined with one another unless technical contradiction arises.

Embodiment 2

Figure 2:
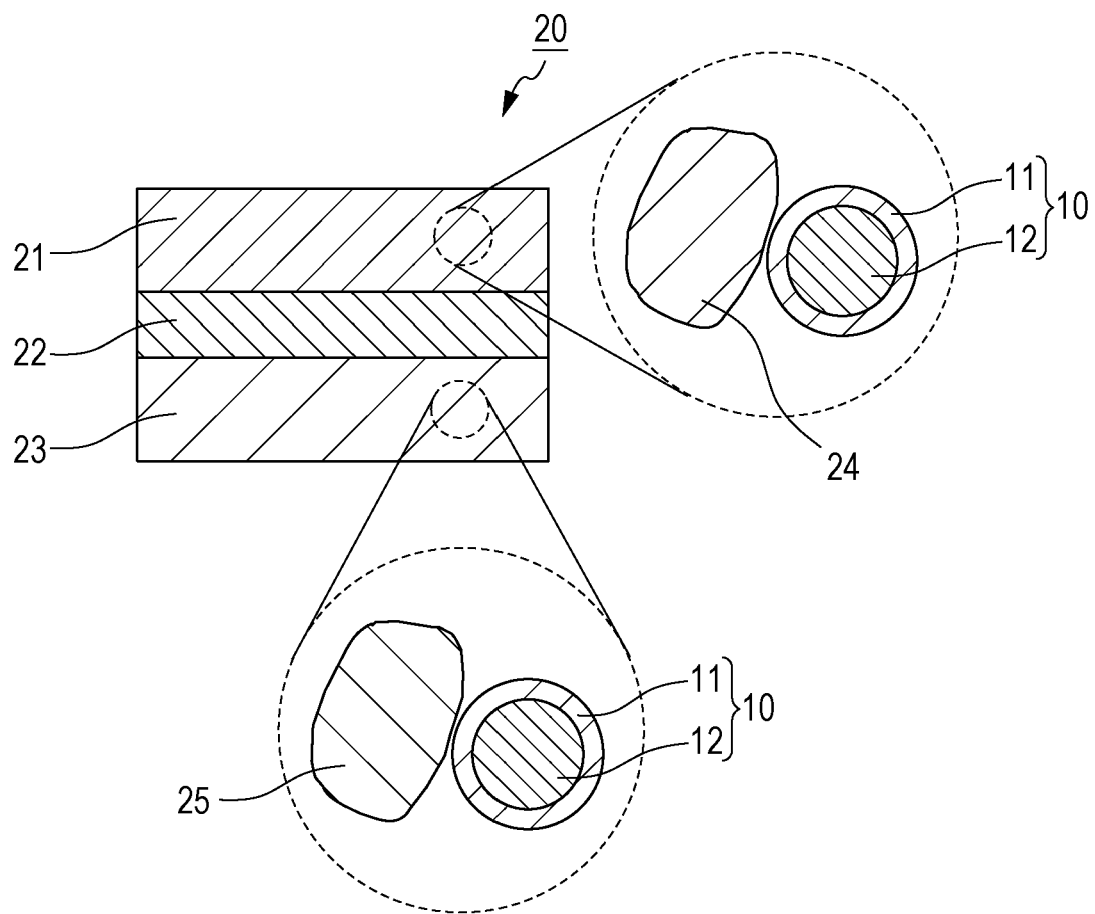
FIG. 2 is a schematic cross-sectional view of a battery according to Embodiment 2.

A battery 20 according to Embodiment 2 includes a positive electrode 21, a negative electrode 23, and an electrolyte layer 22 as illustrated in FIG. 2. The positive electrode 21 includes a positive electrode active material particle 24 and the electrolyte material 10. The electrolyte layer 22 is interposed between the positive electrode 21 and the negative electrode 23. The electrolyte layer 22 is in contact with both of the positive electrode 21 and the negative electrode 23. The electrolyte layer 22 includes an electrolyte material, such as a solid electrolyte material. The negative electrode 23 includes a negative electrode active material particle 25 and the electrolyte material 10. In the battery 20 according to Embodiment 2, the extraction of lithium at the contact interface between the electrolyte material 10 and the positive electrode active material particle 24 may be reduced. Consequently, the battery 20 may have an excellent discharge characteristic.

The positive electrode active material included in the positive electrode 21 is a material capable of occluding and releasing metal ions. Examples of the metal ions include lithium ions. Examples of the positive electrode active material include transition metal oxides that contain lithium, transition metal oxides that do not contain lithium, transition metal fluorides, polyanionic compounds, fluorinated polyanionic compounds, transition metal sulfides, transition metal oxyfluorides, transition metal oxysulfides, and transition metal oxynitrides. In particular, using a lithium transition metal oxide as a positive electrode active material may reduce the production costs of the battery 20 and increase the average discharge voltage of the battery 20. Using a positive electrode active material having a high average reaction voltage enables the electrolyte material 10 to reduce the extraction of lithium in a further sufficient manner.

The positive electrode 21 may include at least one positive electrode active material selected from Li(NiCoAl)O$_2$ and LiCoO$_2$. The above positive electrode active materials may increase the energy density of the battery 20.

The median diameter of the positive electrode active material particle 24 may be 0.1 μm or more and 100 μm or less. When the size of the positive electrode active material particle 24 falls within the adequate range, the degree of dispersion of the positive electrode active material particle 24 and particles of the electrolyte material 10 may be increased. In addition, lithium ions can be quickly diffused in the positive electrode active material particle 24. This allows the battery 20 to be operated with a high power. The positive electrode active material particle 24 may have a larger median diameter than particles of the electrolyte material 10. In such a case, the degree of dispersion of the positive electrode active material particle 24 and particles of the electrolyte material 10 may be increased.

The ratio of the volume v of the positive electrode active material particle 24 to the total volume of the positive electrode active material particle 24 and the electrolyte material 10 is, for example, 30% or more and 95% or less. The ratio of the volume (100−v) of the electrolyte material 10 to the total volume of the positive electrode active material particle 24 and the electrolyte material 10 is, for example, 5% or more and 70% or less. Adjusting the amounts of the positive electrode active material particle 24 and the electrolyte material 10 to be within the adequate ranges may increase the energy density of the battery 20 to a sufficiently high level and allows the battery 20 to be operated with a high power.

The thickness of the positive electrode 21 may be 10 μm or more and 500 μm or less. Adjusting the thickness of the positive electrode 21 to be within the adequate range may increase the energy density of the battery 20 to a sufficiently high level and allows the battery 20 to be operated with a high power.

The electrolyte layer 22 is a layer that includes an electrolyte material. The electrolyte material is, for example, a solid electrolyte material. The electrolyte layer 22 may be a solid-electrolyte layer. The solid-electrolyte layer may be composed only of the electrolyte material 10 or may alternatively be composed only of another sulfide solid electrolyte material having a different composition from the electrolyte material 10. Examples of the other sulfide solid electrolyte material include Li$_2$S—P$_2$S$_5$, Li$_2$S—SiS$_2$, Li$_2$S—B$_2$S$_3$, Li$_2$S—GeS$_2$, Li$_{3.25}$Ge$_{0.25}$P$_{0.75}$S$_4$, and Li$_{10}$GeP$_2$S$_{12}$. Optionally, LiX, Li$_2$O, MO$_q$, Li$_p$MO$_q$, or the like may be added to the sulfide material, where X represents F, Cl, Br, or I; M represents P, Si, Ge, B, Al, Ga, In, Fe, or Zn; and p and q are natural numbers.

The electrolyte layer 22 may include the electrolyte material 10 and the other sulfide solid electrolyte material having a different composition from the electrolyte material 10. Particles of the electrolyte material 10 and particles of the other sulfide solid electrolyte material may be dispersed uniformly in the electrolyte layer 22. A layer composed of the electrolyte material 10 and a layer composed of the other sulfide solid electrolyte material may be arranged on top of each other in the direction in which the positive electrode 21, the electrolyte layer 22, and the negative electrode 23 are stacked on top of one another. For example, the positive electrode 21, a layer composed of the electrolyte material 10, a layer composed of the other sulfide solid electrolyte material, and the negative electrode 23 may be stacked on top of one another in this order. In such a case, the extraction of lithium may be reduced in the positive electrode 21 by a sufficient degree.

The thickness of the electrolyte layer 22 may be 1 μm or more and 200 μm or less. Adjusting the thickness of the electrolyte layer 22 to be within the adequate range prevents, with certainty, the positive electrode 21 and the negative electrode 23 from becoming short-circuited with each other and allows the battery 20 to be operated with a high power.

The negative electrode active material included in the negative electrode 23 is a material capable of occluding and releasing metal ions. Examples of the metal ions include lithium ions. Examples of the negative electrode active material include a metal material, a carbon material, an oxide, a nitride, a tin compound, and a silicon compound. The metal material may be a single-element metal or an alloy. Examples of the metal material include lithium metal and a lithium alloy. Examples of the carbon material include natural graphite, coke, graphitizing carbon, carbon fibers, spherical carbon, artificial graphite, and amorphous carbon. In consideration of capacity density, at least one selected from the group consisting of silicon (Si), tin (Sn), a silicon compound, and a tin compound may be used as a negative electrode active material. In the case where a negative electrode active material having a low average reaction voltage and the electrolyte material 10 are used, the oxide layer 11 prevents the sulfide layer 12 from coming into direct contact with the negative electrode active material and consequently suppresses the electrolysis of the sulfide layer 12.

The median diameter of the negative electrode active material particle 25 may be 0.1 μm or more and 100 μm or less. When the size of the negative electrode active material particle 25 falls within the adequate range, the degree of dispersion of the negative electrode active material particle 25 and particles of the electrolyte material 10 may be increased. In addition, lithium ions can be quickly diffused in the negative electrode active material particle 25. This allows the battery 20 to be operated with a high power. The negative electrode active material particle 25 may have a larger median diameter than particles of the electrolyte material 10. In such a case, the degree of dispersion of the negative electrode active material particle 25 and particles of the electrolyte material 10 may be increased.

The ratio of the volume V of the negative electrode active material particle 25 to the total volume of the negative electrode active material particle 25 and the electrolyte material 10 is, for example, 30% or more and 95% or less. The ratio of the volume (100−V) of the electrolyte material 10 to the total volume of the negative electrode active material particle 25 and the electrolyte material 10 is, for example, 5% or more and 70% or less. Adjusting the volumes of the negative electrode active material particle 25 and the electrolyte material 10 to be within the adequate ranges may increase the energy density of the battery 20 to a sufficiently high level and allows the battery 20 to be operated with a high power.

The thickness of the negative electrode 23 may be 10 μm or more and 500 μm or less. Adjusting the thickness of the negative electrode 23 to be within the adequate range may increase the energy density of the battery 20 to a sufficiently high level and allows the battery 20 to be operated with a high power.

At least one selected from the positive electrode 21 and the negative electrode 23 may include another sulfide solid electrolyte material having a different composition from the electrolyte material 10 in order to increase ionic conductivity. Examples of the other sulfide solid electrolyte material include $Li_2S-P_2S_5$, $Li_2S-SiS_2$, $Li_2S-B_2S_3$, $Li_2S-GeS_2$, $Li_{3.25}Ge_{0.25}P_{0.75}S_4$, and $Li_{10}GeP_2S_{12}$. Optionally, LiX, $Li_2O$, $MO_q$, $Li_pMO_q$, or the like may be added to the sulfide material, where X represents F, Cl, Br, or I; M represents P, Si, Ge, B, Al, Ga, In, Fe, or Zn; and p and q are natural numbers.

At least one selected from the positive electrode 21, the electrolyte layer 22, and the negative electrode 23 may include an oxide solid electrolyte in order to increase ionic conductivity. Examples of the oxide solid electrolyte include NASICON solid electrolytes, such as $LiTi_2(PO_4)_3$ and the element substitution products thereof; $(LaLi)TiO_3$ perovskite solid electrolytes; LISICON solid electrolytes, such as $Li_{14}ZnGe_4O_{16}$, $Li_4SiO_4$, $LiGeO_4$, and the element substitution products thereof; garnet solid electrolytes, such as $Li_7La_3Zr_2O_{12}$ and the element substitution products thereof; $Li_3N$ and the H-substitution products thereof; and $Li_3PO_4$ and the N-substitution products thereof.

At least one selected from the positive electrode 21, the electrolyte layer 22, and the negative electrode 23 may include a halide solid electrolyte in order to increase ionic conductivity. Examples of the halide solid electrolyte include $Li_3InBr_6$, $Li_3InCl_6$, $Li_2FeCl_4$, $Li_2CrCl_4$, and $Li_3OCl$.

At least one selected from the positive electrode 21, the electrolyte layer 22, and the negative electrode 23 may include a complex hydride solid electrolyte in order to increase ionic conductivity. Examples of the complex hydride solid electrolyte include $LiBH_4-LiI$ and $LiBH_4-P_2S_5$.

At least one selected from the positive electrode 21, the electrolyte layer 22, and the negative electrode 23 may include an organic polymer solid electrolyte in order to increase ionic conductivity. Examples of the organic polymer solid electrolyte include compounds produced by the reaction of a high-molecular compound with a lithium salt. The high-molecular compound may have an ethylene oxide structure. A high-molecular compound having an ethylene oxide structure is capable of containing a large amount of lithium salt and, accordingly, further increases ionic conductivity. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The above lithium salts may be used alone or in a mixture of two or more.

At least one selected from the positive electrode 21, the electrolyte layer 22, and the negative electrode 23 may include a nonaqueous electrolyte solution, a gel electrolyte, or an ionic liquid in order to facilitate the occlusion and release of lithium ions and thereby enhance the output characteristic of the battery.

The nonaqueous electrolyte solution includes a nonaqueous solvent and a lithium salt dissolved in the nonaqueous solvent. Examples of the nonaqueous solvent include a cyclic carbonate solvent, a chain carbonate solvent, a cyclic ether solvent, a chain ether solvent, a cyclic ester solvent, a chain ester solvent, and a fluorine solvent. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. The above nonaqueous solvents may be used alone or in a mixture of two or more.

The nonaqueous electrolyte solution may include at least one fluorine solvent selected from the group consisting of fluoroethylene carbonate, methyl fluoropropionate, fluorobenzene, fluoroethyl methyl carbonate, and fluorodimethylene carbonate. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The above lithium salts may be used alone or in a mixture of two or more. The concentration of the lithium salt in the nonaqueous electrolyte solution is, for example, 0.5 to 2 mol/liter.

The gel electrolyte may be a polymer material impregnated with a nonaqueous electrolyte solution. Examples of the polymer material include polyethylene oxide, polyacrylonitrile, polyvinylidene fluoride, polymethyl methacrylate, and a polymer including an ethylene oxide bond.

The ionic liquid may be composed of a cation. Examples of the cation include aliphatic chain quaternary salts, such as tetraalkylammonium and tetraalkylphosphonium; aliphatic cyclic ammonium salts, such as pyrrolidinium salts, morpholinium salts, imidazolinium salts, tetrahydropyrimidinium salts, piperazinium salts, and piperidinium salts; and nitrogen-containing heterocyclic aromatic cations, such as pyridinium salts and imidazolium salts. The ionic liquid may be composed of an anion. Examples of the anion include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may include a lithium salt.

At least one selected from the positive electrode 21, the electrolyte layer 22, and the negative electrode 23 may include a binder in order to increase the adhesion between the particles. Examples of the binder include polyvinylidene fluoride, polytetrafluoroethylene, polyethylene, polypropylene, an aramid resin, polyimide, polyimide, polyimide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyethersulfone, hexafluoropolypropylene, styrene butadiene rubber, and carboxymethyl cellulose. The binder may be a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above materials may also be used as a binder.

The shape of the battery 20 is not limited. The battery 20 may have various shapes, such as a coin-like shape, a cylindrical shape, a rectangular shape, a sheet-like shape, a button-like shape, a flat shape, or a multilayer shape.

In the battery 20 according to Embodiment 2, each of the positive electrode 21, the electrolyte layer 22, and the negative electrode 23 includes the electrolyte material 10. Alternatively, at least one selected from the positive electrode 21, the electrolyte layer 22, and the negative electrode 23 may include the electrolyte material 10. Adding the electrolyte material 10 to at least one selected from the positive electrode 21, the electrolyte layer 22, and the negative electrode 23 may enhance the discharge characteristic of the battery 20 compared with the case where the electrolyte material 10 is not added to any of the positive electrode 21, the electrolyte layer 22, and the negative electrode 23.

At least one selected from the positive electrode 21 and the negative electrode 23 may include the electrolyte material 10. In such a case, the extraction of lithium at the contact interfaces between particles of the electrolyte material 10 and the positive electrode active material particle 24 or at the contact interfaces between particles of the electrolyte material 10 and the negative electrode active material particle 25 may be reduced. As a result, the discharge characteristic of the battery 20 may be enhanced.

For example, in the case where the positive electrode 21 includes the electrolyte material 10, the extraction of lithium at the contact interface between the electrolyte material 10 and the positive electrode active material particle 24 may be reduced in the positive electrode 21, which is likely to be significantly affected by the extraction of lithium. Consequently, the discharge characteristic of the battery 20 may be further enhanced.

Embodiment 3

Since a sulfide solid electrolyte material does not include an organic solvent that becomes decomposed at high potentials in contrast to organic electrolyte solutions, a sulfide solid electrolyte material has a wide potential window. That is, it is considered that a sulfide solid electrolyte material is stable in terms of potential and resistant to decomposition by oxidation. However, as a result of extensive studies, the inventor of the present invention found that a trace amount of lithium may be extracted from a sulfide solid electrolyte material, that is, a sulfide solid electrolyte material may become oxidized, at high potentials. The inventor of the present invention also found that, in the case where the positive electrode includes a conductive additive, the extraction of lithium from a sulfide solid electrolyte material may result in a reduction in the charge/discharge efficiency of a battery.

Figure 3:
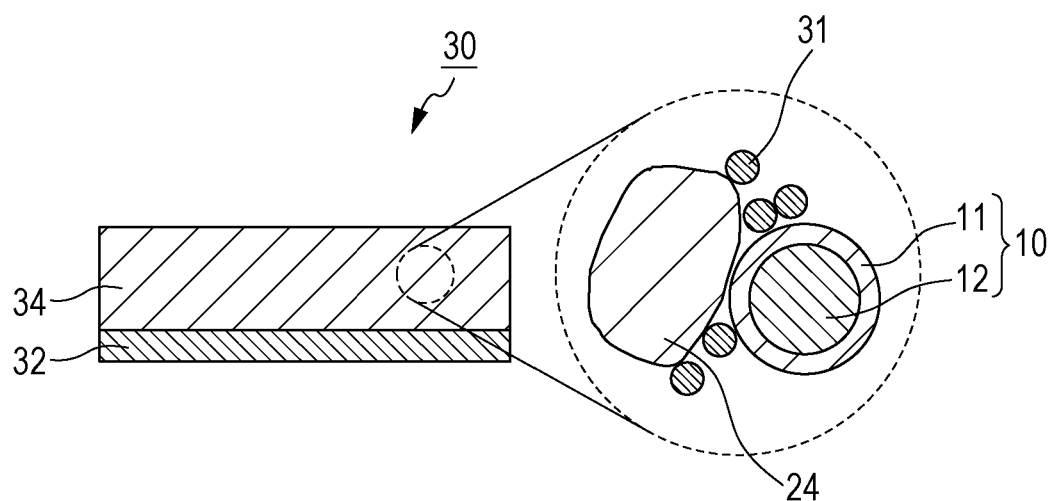
FIG. 3 is a schematic cross-sectional view of a positive electrode according to Embodiment 3.

A positive electrode 30 according to Embodiment 3 includes the electrolyte material 10, the positive electrode active material particle 24, and a conductive additive 31 as illustrated in FIG. 3. The positive electrode 30 may include a positive electrode current collector 32. The electrolyte material 10, the positive electrode active material particle 24, and the conductive additive 31 are included in a positive electrode active material layer 34. The positive electrode active material layer 34 is disposed on the positive electrode current collector 32. In order to bring the positive electrode active material particle 24 into a charge mode, electrons need to be fed from the positive electrode active material particle 24 to the positive electrode current collector 32.

Figure 4:
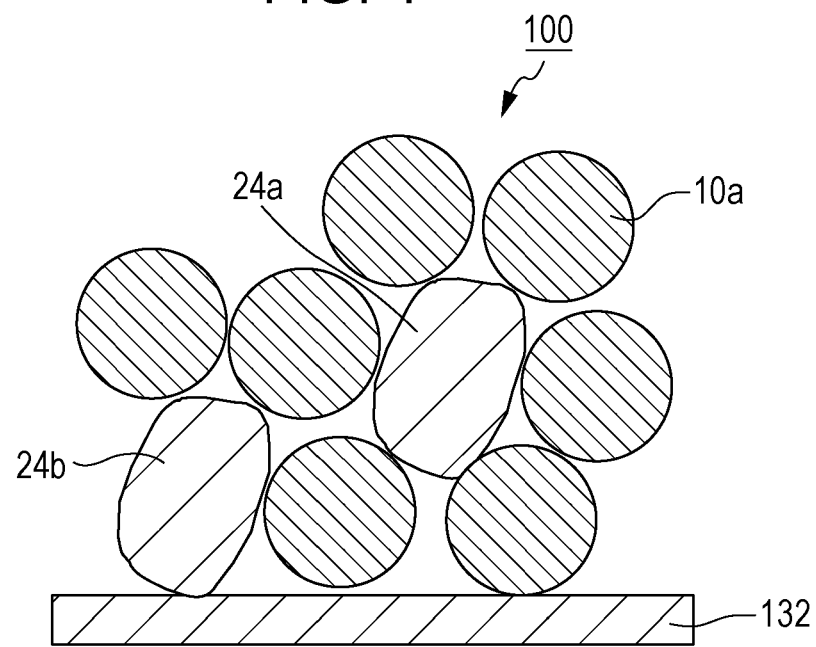
FIG. 4 is a schematic cross-sectional view of a positive electrode that does not include a conductive additive.

For example, the positive electrode 100 illustrated in FIG. 4 includes a positive electrode active material particle 24a, a positive electrode active material particle 24b, and particles of an electrolyte material 10a. The positive electrode 100 does not include a conductive additive. The positive electrode active material particle 24b that is in contact with a positive electrode current collector 132 is capable of feeding electrons to the positive electrode current collector 132. On the other hand, the positive electrode active material particle 24a, which is surrounded by particles of the insulative electrolyte material 10a, is not capable of feeding electrons to the positive electrode current collector 132.

Figure 5:
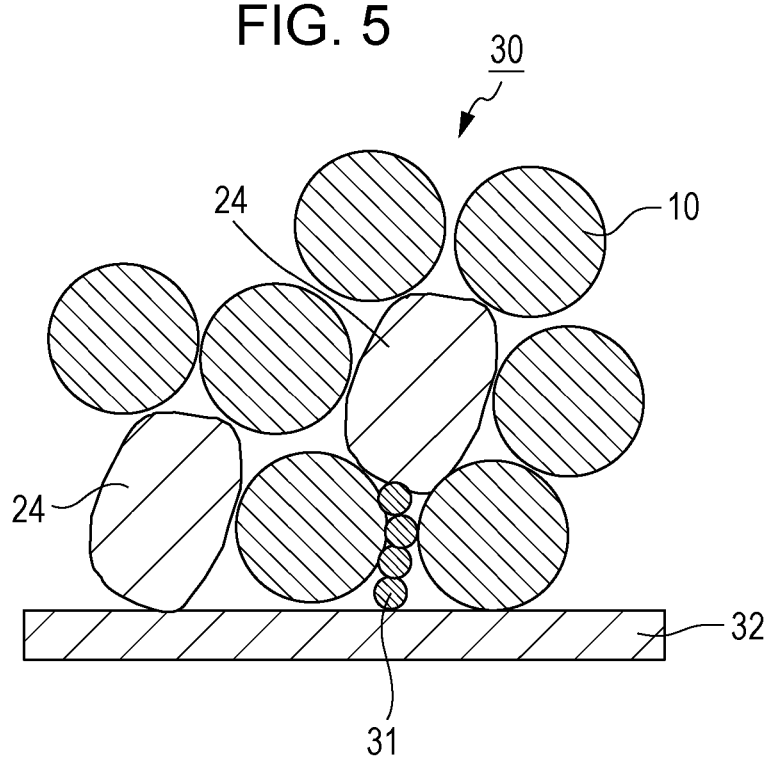
FIG. 5 is a schematic cross-sectional view of a positive electrode that includes a conductive additive.

The positive electrode 30 includes the conductive additive 31 as illustrated in FIG. 5. This enables the positive electrode active material particle 24 to be charged by feeding electrons to the positive electrode current collector 32 through the conductive additive 31 having electron conductivity even when the positive electrode active material particle 24 is surrounded by particles of the electrolyte material 10. The positive electrode 30 has a sufficiently large charge capacity.

In the case where the positive electrode 30 includes the conductive additive 31, electrons may be fed also from the electrolyte material 10 to the positive electrode current collector 32 through the conductive additive 31. Accordingly, an oxidation reaction may occur at the interface between the conductive additive 31 and the electrolyte material 10. The oxidation reaction consumes electric charge and, consequently, may reduce charge/discharge efficiency. Using the electrolyte material 10 according to the present disclosure as a component of the positive electrode 30 may limit the reduction in charge/discharge efficiency.

The electrolyte material 10 according to the present disclosure includes the sulfide layer 12 and the oxide layer 11 disposed on the surface of the sulfide layer 12. The oxidation reaction of the electrolyte material 10 occurs by lithium being extracted from weak lithium-sulfur bonds. The surface layer of the electrolyte material 10 includes lithium-oxygen bonds stronger than lithium-sulfur bonds. Accordingly, the electrolyte material 10 is resistant to the extraction of lithium and, therefore, resistant to oxidation. The positive electrode 30 that includes the positive electrode active material particle 24, the electrolyte material 10, and the conductive additive 31 has a sufficiently high charge capacity. Since the occurrence of oxidation reaction at the interface between the electrolyte material 10 and the conductive additive 31 is reduced, the positive electrode 30 has a markedly high charge/discharge efficiency.

The above-described advantageous effects may be increased to a sufficient level when the oxygen/lithium element ratio x at the 4-nm depth position satisfies $0.51 \leq x$. When the ratio x satisfies $0.51 \leq x$, the oxygen/lithium element ratio in the surface of the electrolyte material 10 (i.e., the surface of the oxide layer 11) is sufficiently high. That is, the proportion of the number of lithium-oxygen bonds in the surface of the electrolyte material 10 is sufficiently large. In such a case, the occurrence of oxidation reaction at the interface between the conductive additive 31 and the electrolyte material 10 may be reduced by a sufficient degree and, consequently, the charge/discharge efficiency of the positive electrode 30 may be increased.

If the ratio x satisfies $x<0.51$, the oxygen/lithium element ratio in the surface of the sulfide solid electrolyte material is low. That is, the proportion of the number of lithium-oxygen bonds in the surface of the sulfide solid electrolyte material is small. In such a case, the occurrence of oxidation reaction at the interface between the conductive additive and the sulfide solid electrolyte material may fail to be reduced by a sufficient degree and, accordingly, the charge/discharge efficiency of the positive electrode may be reduced.

The ratio x may be lower than 2. When the ratio x is 2 or more, the occurrence of oxidation reaction, that is, the extraction of lithium, at the interface between the conductive additive 31 and the electrolyte material 10 may be reduced by a sufficient degree. However, when the ratio x is 2 or more, not only lithium-oxygen bonds required for reducing the extraction of lithium but also other types of bonds including oxygen may be included in the electrolyte material 10 in excessively large amounts. Examples of the other types of bonds include a double bond between a cationic element other than lithium (e.g., phosphorus, silicon, germanium, or boron) and oxygen and a crosslinking bond having a structure of cationic element-oxygen-cationic element. If the electrolyte material 10 includes the other types of bonds in excessive amounts, the ionic conductivity of the surface layer of the electrolyte material 10 may be reduced.

The shape of the conductive additive 31 is not limited and may be, for example, an acicular shape, a scale-like shape, a spherical shape, or an ellipsoidal shape. The conductive additive 31 may be provided in the form of particles.

Examples of the conductive additive 31 include graphites, such as natural graphite and artificial graphite; carbon blacks, such as acetylene black and Ketjen black; conductive fibers, such as carbon fibers and metal fibers; metal powders, such as a fluorocarbon powder and an aluminum powder; conductive whiskers, such as zinc oxide whiskers and potassium titanate whiskers; conductive metal oxides, such as titanium oxide; and conductive polymers, such as polyaniline, polypyrrole, and polythiophene.

The conductive additive 31 is, for example, acetylene black. Acetylene black has a high electron conductivity and a relatively small particle diameter. The smaller the diameter of particles, the higher the dispersibility of the particles. Using an acetylene black powder as the conductive additive 31 may increase the charge characteristic of a battery and reduce the production costs of a battery.

The positive electrode 30 may be used as a component of a battery. Such a battery includes the positive electrode 30, a negative electrode, and an electrolyte layer. The electrolyte layer is interposed between the positive electrode 30 and the negative electrode. The negative electrode and the electrolyte layer may be the same as the negative electrode 23 and the electrolyte layer 22 described in Embodiment 2. The positive electrode 30 according to Embodiment 3 enables the production of a battery having a sufficiently large charge capacity.

Embodiment 4

Figure 6:
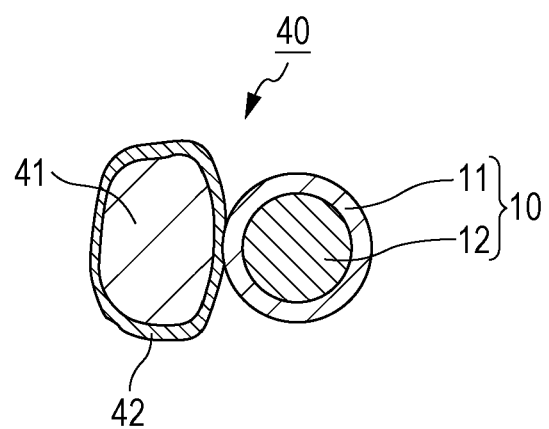
FIG. 6 is a schematic cross-sectional view of an electrode material according to Embodiment 4.

An electrode material 40 according to Embodiment 4 includes the electrolyte material 10 and an electrode active material particle 41 as illustrated in FIG. 6. In Embodiment 4, the electrolyte material 10 is particulate. The electrode active material particle 41 is provided with a coating layer 42 disposed on the surface thereof. The coating layer 42 is a layer including a coating material.

Figure 7:
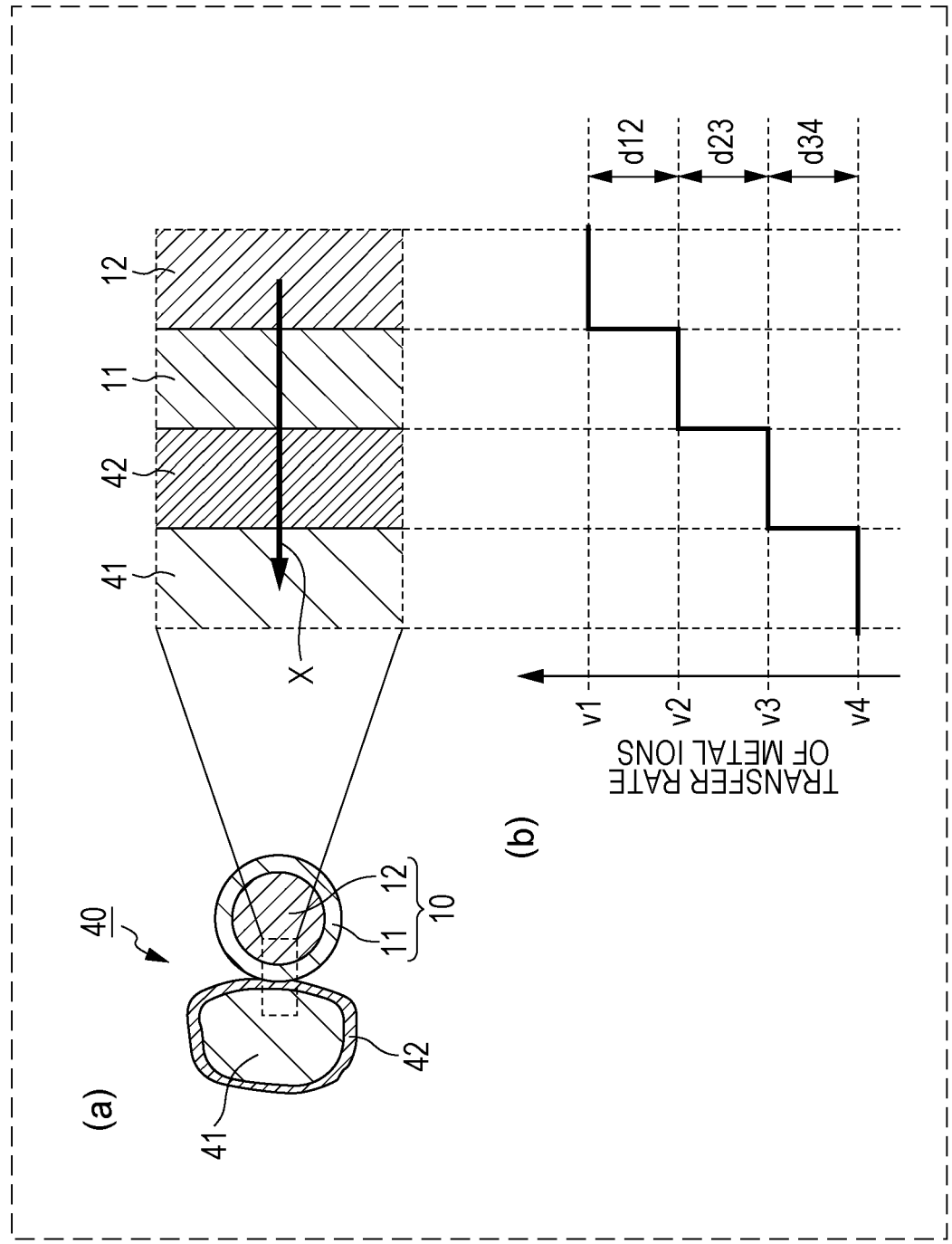
FIG. 7 includes diagrams illustrating the transfer rate of metal ions in an electrode material according to Embodiment 4.

FIG. 7(a) is a partial enlarged cross-sectional view of the electrode material according to Embodiment 4. FIG. 7(b) is a graph illustrating the transfer rate of metal ions in the electrode material according to Embodiment 4. The arrow X indicates the direction in which metal ions transfer. In the case where the electrode active material particle 41 is a particle of a positive electrode active material, the arrow X shown in FIG. 7(a) indicates the direction in which metal ions transfer when a battery is discharged.

The transfer rates of metal ions in the respective layers are denoted by v1 to v4 as illustrated in FIG. 7(b); v1 is the transfer rate of metal ions in the sulfide layer 12, v2 is the transfer rate of metal ions in the oxide layer 11, v3 is the transfer rate of metal ions in the coating layer 42, and v4 is the transfer rate of metal ions in the electrode active material particle 41.

In FIG. 7(b), d12, d23, and d34 denote a difference in transfer rate between adjacent two layers; d12 is the difference between v1 and v2, d23 is the difference between v2 and v3, and d34 is the difference between v3 and v4. The transfer rates v1 to v4 of metal ions in the respective layers are each determined by the conductivity of metal ions in the layer. Since the oxide layer 11 has a lower metal ion conductivity than the sulfide layer 12, v2<v1. Since the coating layer 42 has a lower metal ion conductivity than the oxide layer 11, v3<v2. Since the electrode active material particle 41 has a lower metal ion conductivity than the coating layer 42, v4<v3.

The electrode material 40 satisfies v4<v3<v2<v1. In other words, the transfer rate of metal ions in the electrode material 40 decreases in a stepwise manner in the direction of the sulfide layer 12, the oxide layer 11, the coating layer 42, and the electrode active material particle 41. Therefore, any of d12, d23, and d34 is not large, and a sudden change in transfer rate does not occur at any of the interfaces between the layers. In the electrode material 40 according to Embodiment 4, the retention of metal ions due to a sudden change in transfer rate may be reduced. Furthermore, an increase in the concentration of metal ions at the interfaces between the layers constituting the electrode material 40 may be limited. For example, in the case where the electrode active material particle 41 is a particle of a positive electrode active material, when a battery including the electrode material 40 is discharged, a reduction in potential due to increases in the concentrations of metal ions at the interfaces between the layers constituting the electrode material 40 may be limited. In addition, the likelihood of the discharge of the battery being terminated at an early stage as a result of a reduction in potential may be reduced. This enables the battery to be discharged to a sufficient degree and, consequently, may increase the charge/discharge efficiency of the battery.

Figure 8:
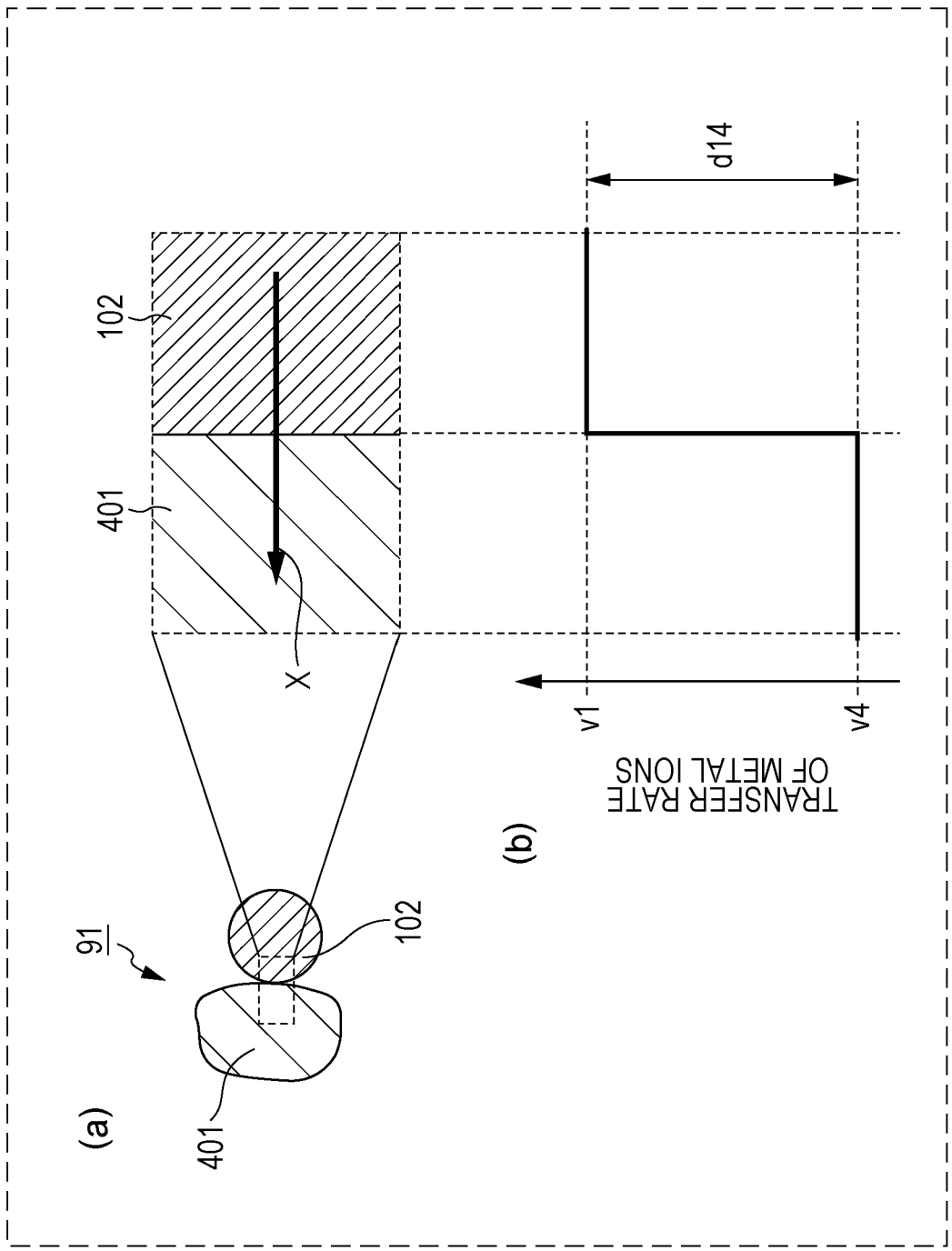
FIG. 8 includes diagrams illustrating the transfer rate of metal ions in an electrode material according to Comparative example A.

FIG. 8(a) is a partial enlarged cross-sectional view of an electrode material 91 according to Comparative example A. FIG. 8(b) is a graph illustrating the transfer rate of metal ions in the electrode material 91 according to Comparative example A. The electrode material 91 includes an electrolyte material 102 and an electrode active material particle 401. The electrolyte material 102 is composed only of a sulfide layer. No coating layer is disposed on the surface of the electrode active material particle 401.

In FIG. 8(b), d14 denotes the difference between v1 and v4. That is, d14 denotes the difference in the transfer rate of metal ions at the interface between the electrolyte material 102 and the electrode active material particle 401. The difference d14 is larger than any of d12, d23, and d34 illustrated in FIG. 7(b). That is, a sudden change in transfer rate occurs at the interface between the electrolyte material 102 and the electrode active material particle 401.

The transfer rate v4 of metal ions inside the electrode active material particle 401 is considerably low, while the transfer rate v1 of metal ions inside the electrolyte material 102 is considerably high. Therefore, in the case where the electrode active material particle 401 is a particle of a positive electrode active material, when a battery including the electrode material 91 is discharged, the rate at which metal ions diffuse inside the electrode active material particle 401 cannot increase in accordance with an increase in the rate at which metal ions are fed from the electrolyte material 102 to the electrode active material particle 401. Consequently, the concentration of metal ions in the surface layer of the electrode active material particle 401 is increased, and potential is reduced. Furthermore, since the concentration of metal ions inside the electrode active material particle 401 is low, the discharge of the battery may be terminated at an early stage although the battery has not been discharged to a sufficient degree. As a result, the battery may fail to be discharged to a sufficient degree. Thus, a battery that includes the electrode material 91 may have a low charge/discharge efficiency.

Figure 9:
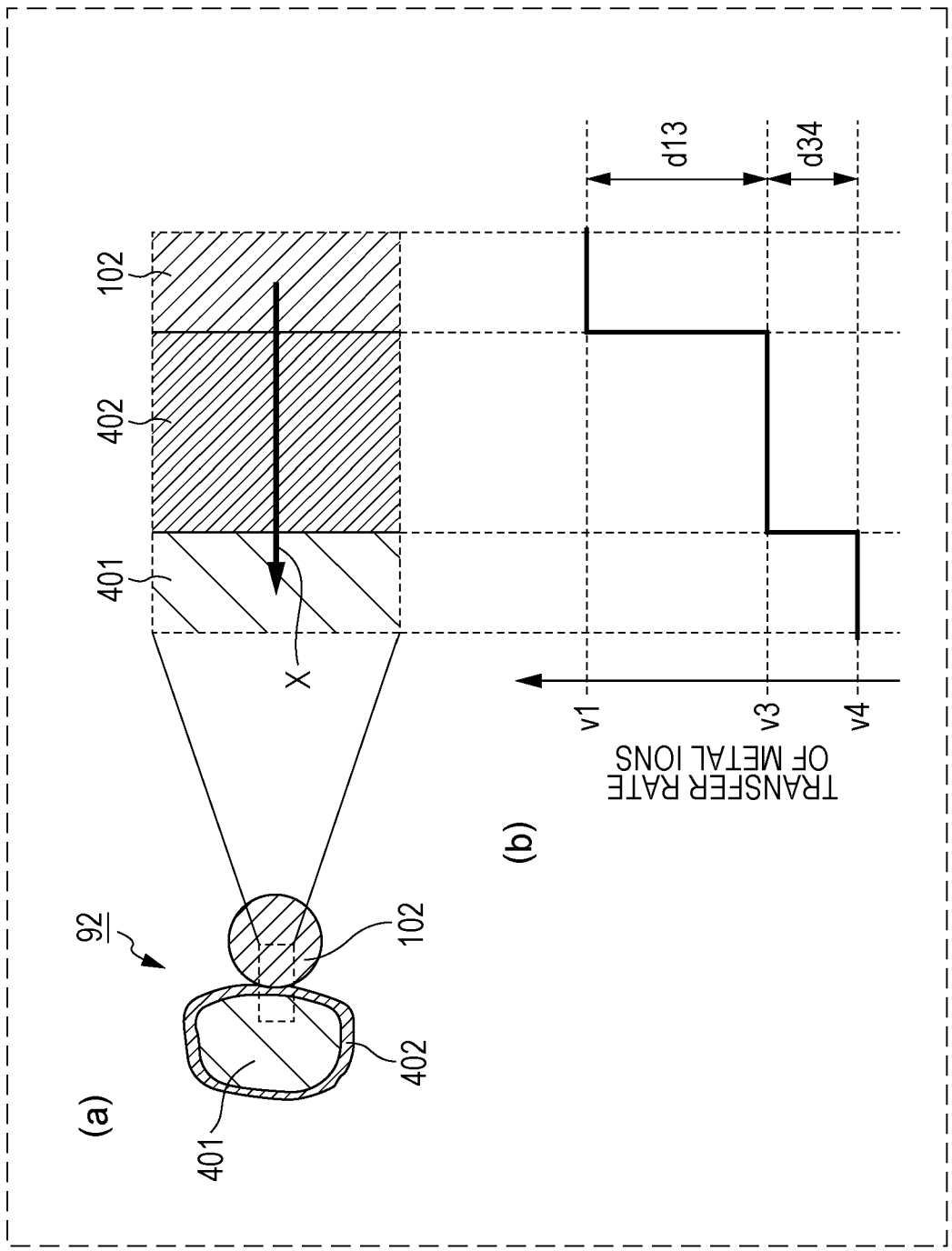
FIG. 9 includes diagrams illustrating the transfer rate of metal ions in an electrode material according to Comparative example B.

FIG. 9(a) is a partial enlarged cross-sectional view of an electrode material 92 according to Comparative example B. FIG. 9(b) is a graph illustrating the transfer rate of metal ions in the electrode material 92 according to Comparative example B. The electrode material 92 includes an electrolyte material 102 and an electrode active material particle 401. The electrolyte material 102 is composed only of a sulfide layer. A coating layer 402 is disposed on the surface of the electrode active material particle 401.

In FIG. 9(b), d13 denotes the difference between v1 and v3, and d34 denotes the difference between v3 and v4. That is, d13 denotes the difference in the transfer rate of metal ions at the interface between the electrolyte material 102 and the coating layer 402. The difference d13 is larger than any of d12, d23, and d34 illustrated in FIG. 7(b). That is, a sudden change in transfer rate occurs at the interface between the electrolyte material 102 and the coating layer 402.

The coating material constituting the coating layer 402 is an oxide that conducts lithium ions which is disclosed in Japanese Unexamined Patent Application Publication No. 2011-129312. The metal ion conductivity (i.e., lithium ion conductivity) of the coating layer 402 is about $1 \times 10^{-7}$ S/cm. The metal ion conductivity (i.e., lithium ion conductivity) of the electrolyte material 102 is about $1 \times 10^{-3}$ S/cm.

The transfer rate v3 of metal ions inside the coating layer 402 is relatively low, while the transfer rate v1 of metal ions inside the electrolyte material 102 is considerably high. Therefore, in the case where the electrode active material particle 401 is a particle of a positive electrode active material, when a battery including the electrode material 92 is discharged, the rate at which metal ions diffuse inside the coating layer 402 cannot increase in accordance with an increase in the rate at which metal ions are fed from the electrolyte material 102 to the coating layer 402. Consequently, the concentration of metal ions in the surface layer of the coating layer 402 is increased, and potential is reduced. Furthermore, since the concentration of metal ions inside the electrode active material particle 401 is low, the discharge of the battery may be terminated at an early stage although the battery has not been discharged to a sufficient degree. As a result, the battery may fail to be discharged to a sufficient degree. Thus, a battery that includes the electrode material 92 may have a low charge/discharge efficiency.

Figure 10:
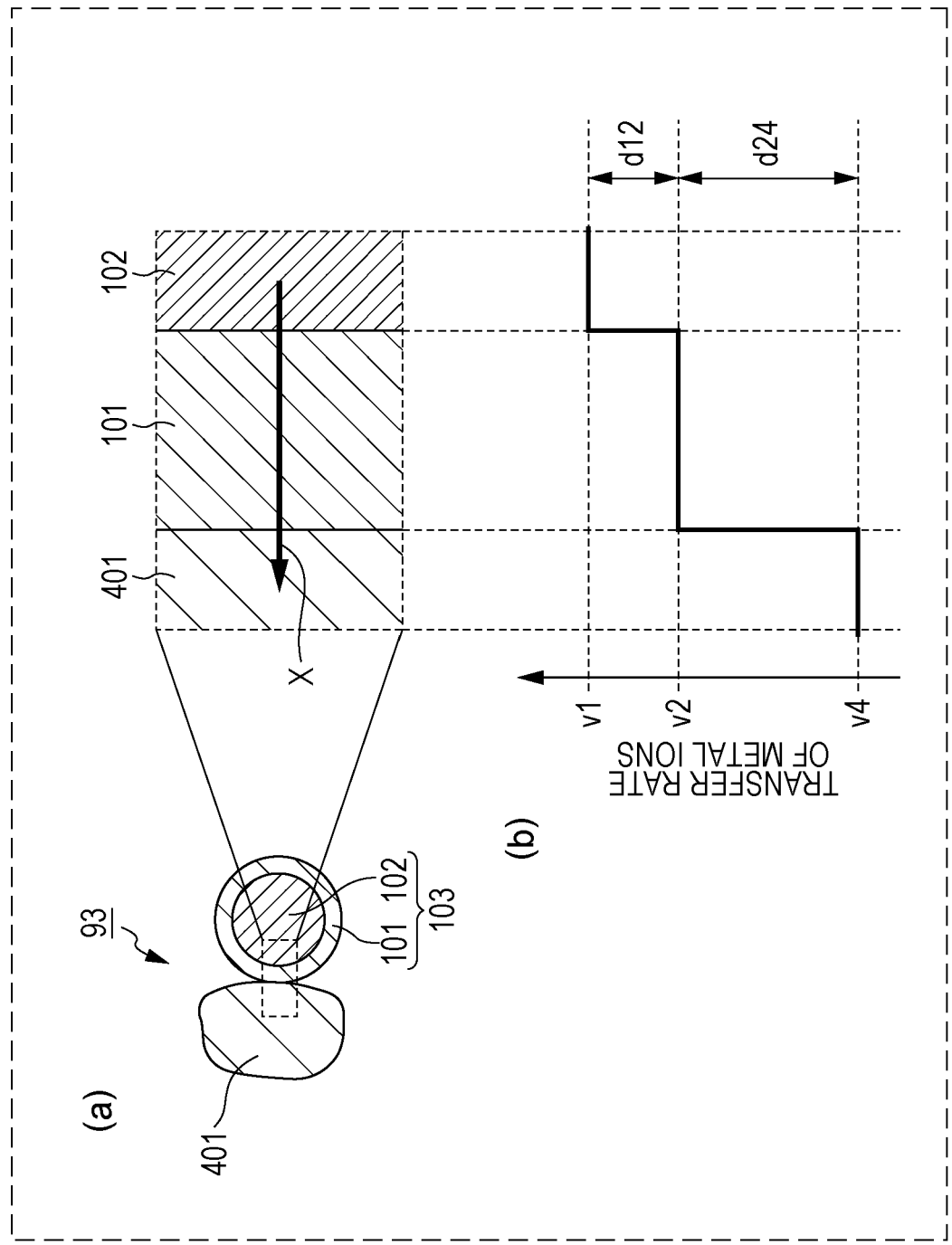
FIG. 10 includes diagrams illustrating the transfer rate of metal ions in an electrode material according to Comparative example C.

FIG. 10(a) is a partial enlarged cross-sectional view of an electrode material 93 according to Comparative example C. FIG. 10(b) is a graph illustrating the transfer rate of metal ions in the electrode material 93 according to Comparative example C. The electrode material 93 includes an electrolyte material 103 and an electrode active material particle 401. The electrolyte material 103 includes a sulfide layer 102 and an oxide layer 101. No coating layer is disposed on the surface of the electrode active material particle 401.

In FIG. 10(b), d12 denotes the difference between v1 and v2, and d24 denotes the difference between v2 and v4. That is, d24 denotes the difference in the transfer rate of metal ions at the interface between the oxide layer 101 and the electrode active material particle 401. The difference d24 is larger than any of d12, d23, and d34 illustrated in FIG. 7(b). That is, a sudden change in transfer rate occurs at the interface between the oxide layer 101 and the electrode active material particle 401.

The oxide layer 101 is the oxide layer disclosed in Japanese Unexamined Patent Application Publication No. 2011-129312. The metal ion conductivity (i.e., lithium ion conductivity) of the oxide layer 101 is about $1 \times 10^{-5}$ S/cm.

The transfer rate v4 of metal ions inside the electrode active material particle 401 is considerably low, while the transfer rate v2 of metal ions inside the oxide layer 101 is relatively high. Therefore, in the case where the electrode active material particle 401 is a particle of a positive electrode active material, when a battery including the electrode material 93 is discharged, the rate at which metal ions diffuse inside the electrode active material particle 401 cannot increase in accordance with an increase in the rate at which metal ions are fed from the oxide layer 101 to the electrode active material particle 401. Consequently, the concentration of metal ions in the surface layer of the electrode active material particle 401 is increased, and potential is reduced. Furthermore, since the concentration of metal ions inside the electrode active material particle 401 is low, the discharge of the battery may be terminated at an early stage although the battery has not been discharged to a sufficient degree. As a result, the battery may fail to be discharged to a sufficient degree. Thus, a battery that includes the electrode material 93 may have a low charge/discharge efficiency.

A low charge/discharge efficiency means that only part of electric charge used for charging a battery is used when the battery is discharged. A low charge/discharge efficiency also means that the reversible capacity of a battery is small and the energy density of the battery is low. It is known that the charge/discharge efficiencies of the second batteries including an electrolyte solution which are proposed in the related art are reduced by, for example, the following factors: decomposition of an electrolyte by oxidation during charging; degradation in current collecting property due to swelling of an active material; and formation of a passive film on a negative electrode.

The inventor of the present invention conducted extensive studies of a second battery that includes a sulfide solid electrolyte and, as a result, found that a reduction in charge/discharge efficiency may be caused also by the retention of metal ions at the interface between the sulfide solid electrolyte and a positive electrode active material due to a difference in the transfer rate of metal ions.

From the above viewpoint, in the electrode material 40 according to Embodiment 4, the difference in the transfer rate of metal ions at the interface between the sulfide layer 12 and the electrode active material particle 41 is smaller than any of the differences in transfer rate determined in Comparative examples A, B, and C. Therefore, the electrode material 40 is capable of increasing the charge/discharge efficiency of a battery. In particular, the electrode material 40 is capable of increasing the initial charge/discharge efficiency of a battery. The term "initial charge/discharge efficiency" used herein refers to the ratio of initial discharge capacity to initial charge capacity.

In the electrode material 40, the metal ions may be lithium ions. In such a case, the electrode material 40 may be used as an electrode material for lithium secondary batteries.

The electrode active material particle 41 may be used as a positive electrode active material or a negative electrode active material. The electrode active material particle 41 may be a particle of the positive electrode active material or the negative electrode active material described in Embodiment 2. The electrode active material particle 41 may be composed of Li(NiCoAl)O$_2$, which is used as an electrode active material. Using Li(NiCoAl)O$_2$ as an electrode active material enables the production of a battery having a high energy density.

The coating layer 42 may be a layer composed only of a coating material or may be a layer composed primarily of a coating material. For example, the coating layer 42 may be a layer including a coating material such that the proportion of the amount of coating material to the total amount of the coating layer 42 is 50 wt % or more.

The coating material may be a material having a lithium ion conductivity of $10^{-9}$ to $10^{-6}$ S/cm. Using a coating material having a lithium ion conductivity of $10^{-9}$ S/cm or more prevents an excessive increase in the difference in the transfer rate of lithium ions between the coating layer 42 and the oxide layer 11 and, consequently, may further increase charge/discharge efficiency. Using a coating material having a lithium ion conductivity of $10^{-6}$ S/cm or less prevents an excessive increase in the difference in the transfer rate of lithium ions between the coating layer 42 and the electrode active material particle 41 and, consequently, may further increase charge/discharge efficiency.

Examples of the coating material include solid electrolytes, such as a sulfide solid electrolyte, an oxide solid electrolyte, a halide solid electrolyte, a polymer solid electrolyte, and a complex hydride solid electrolyte. In Embodiment 4, the coating material may be an oxide solid electrolyte. Since an oxide solid electrolyte is highly stable at high potentials, using an oxide solid electrolyte as a coating material may further increase charge/discharge efficiency.

Examples of the oxide solid electrolyte that can be used as a coating material include Li—Nb—O compounds, such as $LiNbO_3$, Li—B—O compounds, such as $LiBO_2$ and $Li_3BO_3$, Li—Al—O compounds, such as $LiAlO_2$, Li—Si—O compounds, such as $Li_4SiO_4$, $Li_2SO_4$, Li—Ti—O compounds, such as $Li_4Ti_5O_{12}$, Li—Zr—O compounds, such as $Li_2ZrO_3$, Li—Mo—O compounds, such as $Li_2MoO_3$, Li—V—O compounds, such as $LiV_2O_5$, and Li—W—O compounds, such as $Li_2WO_4$.

The coating material may be $LiNbO_3$. $LiNbO_3$ has a lithium ion conductivity of about $10^{-7}$ S/cm. The transfer rate of lithium ions in $LiNbO_3$ is intermediate between that in the electrode active material particle 41 and that in the oxide layer 11. In addition, $LiNbO_3$ has high electrochemical stability. Therefore, using $LiNbO_3$ as a coating material may further increase charge/discharge efficiency.

The thickness of the coating layer 42 may be 1 nm or more and 100 nm or less. Setting the thickness of the coating layer 42 to 1 nm or more enables the stepwise reduction in the transfer rate of lithium ions in the order of the electrode active material particle 41, the coating layer 42, and the oxide layer 11 with certainty and, consequently, may increase charge/discharge efficiency. Setting the thickness of the coating layer 42 to 100 nm or less prevents an excessive increase in the thickness of the coating layer 42 having a low ionic conductivity and may reduce the inside resistance of the battery to a sufficiently low level. Consequently, the energy density of the battery may be increased.

The coating layer 42 may cover the entire surface of the electrode active material particle 41 uniformly. In such a case, the stepwise reduction in the transfer rate of lithium ions in the order of the electrode active material particle 41, the coating layer 42, and the oxide layer 11 may be achieved with certainty. The coating layer 42 may cover only a part of the surface of the electrode active material particle 41. In such a case, the electron conductivity between a plurality of electrode active material particles 41 that include the coating layer 42 may be increased. This allows the battery to be operated with a high power.

The thickness of the coating layer 42 is the average thickness of the coating layer which is determined by, for example, the following method. A cross section of the electrode active material particle 41 covered with the coating layer 42 is formed by, for example, focused ion beam cutting. The cross section is inspected with a transmission electron microscope in order to determine the thickness of the coating layer 42. Specifically, the thicknesses of the coating layers of a plurality (e.g., ten) of the electrode active material particles 41 are measured, and the average thereof is considered to be the thickness of the coating layer 42.

The ratio of lithium ion conductivity of the oxide layer 11 to the lithium ion conductivity of the coating layer 42 may be less than 1000. In such a case, the difference in the transfer rate of lithium ions is reduced and, consequently, charge/discharge efficiency may be further increased.

In electrode material 40, a particle of the electrolyte material 10 and the electrode active material particle 41 may be in contact with each other as illustrated in FIG. 6. In such a case, the coating layer 42 and the oxide layer 11 are in contact with each other.

The electrode material 40 may include a plurality of particles of the electrolyte material 10 and a plurality of the electrode active material particles 41. The amount (i.e., weight) of the electrolyte material 10 included in the electrode material 40 may be the same as the amount of the electrode active material particle 41 included in the electrode material 40 or different from the amount of the electrode active material particle 41 included in the electrode material 40.

Method for Producing Electrode Material

The electrode material 40 may be produced by the following method. The electrolyte material 10 may be produced by the production method described in Embodiment 1. The electrode active material particles 41 covered with the coating layer 42 may be produced by the following method. First, a coating material that constitutes the coating layer 42 is dissolved in a solvent to form a coating solution. The coating solution is deposited on the electrode active material particles 41 by, for example, dispersing the electrode active material particles 41 in the coating solution. Subsequently, the electrode active material particles 41 are dried. For drying the electrode active material particles 41, an additional process, such as heat treatment, may be performed optionally. Hereby, the electrode active material particles 41 each covered with the coating layer 42 are prepared. The electrolyte material 10 and the electrode active material particles 41 are mixed with each other at a predetermined mixing ratio. Hereby, the electrode material 40 is produced.

Embodiment 5

Figure 11:
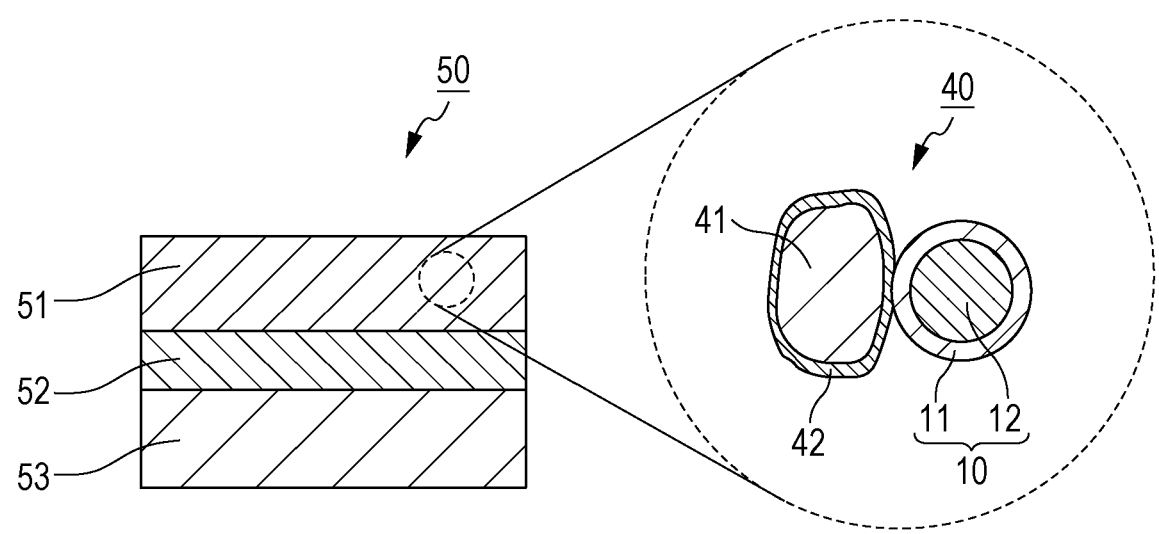
FIG. 11 is a schematic cross-sectional view of a battery according to Embodiment 5.

A battery 50 according to Embodiment 5 includes a positive electrode 51, an electrolyte layer 52, and a negative electrode 53 as illustrated in FIG. 11. The positive electrode 51 includes the electrode material 40. The electrode active material particle 41 included in the electrode material 40 is a particle of a positive electrode active material. The electrolyte layer 52 is interposed between the positive electrode 51 and the negative electrode 53.

The ratio of the volume v of the electrode active material particle 41 to the total volume of the electrode active material particle 41 and the electrolyte material 10 is, for example, 30% or more and 95% or less. Adjusting the amount of the electrode active material particle 41 to be within the adequate range may increase the energy density of the battery 50 to a sufficiently high level and allows the battery 50 to be operated with a high power.

The thickness of the positive electrode 51 may be 10 μm or more and 500 μm or less. Adjusting the thickness of the positive electrode 51 to be within the adequate range may increase the energy density of the battery 50 to a sufficiently high level and allows the battery 50 to be operated with a high power.

The electrolyte layer 52 is a layer that includes an electrolyte material. The electrolyte material is, for example, a solid electrolyte material. The electrolyte layer 52 may be a solid-electrolyte layer. The electrolyte layer 52 may be composed of a sulfide material. Examples of the sulfide material include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Optionally, LiX, $Li_2O$, $MO_q$, $Li_pMO_q$, or the like may be added to the sulfide material, where X represents F, Cl, Br, or I; M represents P, Si, Ge, B, Al, Ga, In, Fe, or Zn; and p and q are natural numbers.

The electrolyte layer 52 may include the electrolyte material 10. The electrolyte layer 52 may include the above sulfide material and the electrolyte material 10. The above sulfide material and the electrolyte material 10 may be dispersed uniformly in the electrolyte layer 52. A layer composed of the electrolyte material 10 and a layer composed of the sulfide material may be arranged on top of each other in the direction in which the positive electrode 51, the electrolyte layer 52, and the negative electrode 53 are stacked on top of one another. For example, the positive electrode 51, a layer composed of the electrolyte material 10, a layer composed of the sulfide material, and the negative electrode 53 may be stacked on top of one another in this order. In the case where the positive electrode 51 and a layer composed of the electrolyte material 10 are in direct contact with each other, the oxide layer 11 included in the electrolyte material 10 prevents the direct contact of the sulfide layer 12 with the positive electrode 51 and may reduce the electrolysis of the sulfide layer 12. This may further increase charge/discharge efficiency.

The thickness of the electrolyte layer 52 may be 1 µm or more and 200 µm or less. Adjusting the thickness of the electrolyte layer 52 to be within the adequate range prevents, with certainty, the positive electrode 51 and the negative electrode 53 from becoming short-circuited with each other and allows the battery 50 to be operated with a high power.

The negative electrode active material included in the negative electrode 53 is a material capable of occluding and releasing metal ions. Examples of the metal ions include lithium ions. Examples of the negative electrode active material include a metal material, a carbon material, an oxide, a nitride, a tin compound, and a silicon compound. The metal material may be a single-element metal or an alloy. Examples of the metal material include lithium metal and a lithium alloy. Examples of the carbon material include natural graphite, coke, graphitizing carbon, carbon fibers, spherical carbon, artificial graphite, and amorphous carbon. In consideration of capacity density, at least one selected from the group consisting of silicon (Si), tin (Sn), a silicon compound, and a tin compound may be used as a negative electrode active material.

The negative electrode 53 may include a sulfide material. When the negative electrode 53 includes a sulfide material, the lithium ion conductivity of the inside of the negative electrode 53 is increased, which allows the battery 50 to be operated with a high power. The sulfide material may be the same as the sulfide material that can be included in the electrolyte layer 52. The negative electrode 53 may include the electrolyte material 10. Adding the electrolyte material 10 to the negative electrode 53 limits an increase in resistance at the interface between the negative electrode active material and the sulfide material that are included in the negative electrode 53 and allows the battery 50 to be operated with a high power.

The negative electrode 53 may further include the negative electrode active material particle 25 described with reference to FIG. 2. The median diameter of the negative electrode active material particle 25 may be larger than the median diameter of particles of the sulfide material. In such a case, the degree of dispersion of the negative electrode active material particle 25 and particles of the sulfide material may be increased.

The ratio of the volume V of the negative electrode active material particle 25 to the total volume of the negative electrode active material particle 25 and the sulfide material is, for example, 30% or more and 95% or less. The ratio of the volume (100−V) of the sulfide material to the total volume of the negative electrode active material particle 25 and the sulfide material is, for example, 5% or more and 70% or less. Adjusting the volumes of the negative electrode active material particle 25 and the sulfide material to be within the adequate ranges may increase the energy density of the battery 50 to a sufficiently high level and allows the battery 50 to be operated with a high power.

The thickness of the negative electrode 53 may be 10 µm or more and 500 µm or less. Adjusting the thickness of the negative electrode 53 to be within the adequate range may increase the energy density of the battery 50 to a sufficiently high level and allows the battery 50 to be operated with a high power.

At least one selected from the positive electrode 51, the electrolyte layer 52, and the negative electrode 53 may include an oxide solid electrolyte in order to increase ionic conductivity. Examples of the oxide solid electrolyte include NASICON solid electrolytes, such as $LiTi_2(PO_4)_3$ and the element substitution products thereof; $(LaLi)TiO_3$ perovskite solid electrolytes; LISICON solid electrolytes, such as $Li_{14}ZnGe_4O_{16}$, $Li_4SiO_4$, $LiGeO_4$, and the element substitution products thereof; garnet solid electrolytes, such as $Li_7La_3Zr_2O_{12}$ and the element substitution products thereof; $Li_3N$ and the H-substitution products thereof; and $Li_3PO_4$ and the N-substitution products thereof.

At least one selected from the positive electrode 51, the electrolyte layer 52, and the negative electrode 53 may include a halide solid electrolyte in order to increase ionic conductivity. Examples of the halide solid electrolyte include $Li_3InBr_6$, $Li_3InCl_6$, $Li_2FeCl_4$, $Li_2CrCl_4$, and $Li_3OCl$.

At least one selected from the positive electrode 51, the electrolyte layer 52, and the negative electrode 53 may include a complex hydride solid electrolyte in order to increase ionic conductivity. Examples of the complex hydride solid electrolyte include $LiBH_4$—LiI and $LiBH_4$—$P_2S_5$.

At least one selected from the positive electrode 51, the electrolyte layer 52, and the negative electrode 53 may include an organic polymer solid electrolyte in order to increase ionic conductivity. Examples of the organic polymer solid electrolyte include compounds produced by the reaction of a high-molecular compound with a lithium salt. The high-molecular compound may have an ethylene oxide structure. A high-molecular compound having an ethylene oxide structure is capable of containing a large amount of lithium salt and, accordingly, may further increase ionic conductivity. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The above lithium salts may be used alone or in a mixture of two or more.

At least one selected from the positive electrode 51, the electrolyte layer 52, and the negative electrode 53 may include a nonaqueous electrolyte solution, a gel electrolyte, or an ionic liquid in order to facilitate the occlusion and release of lithium ions and thereby enhance the output characteristic of the battery.

The nonaqueous electrolyte solution includes a nonaqueous solvent and a lithium salt dissolved in the nonaqueous solvent. Examples of the nonaqueous solvent include a cyclic carbonate solvent, a chain carbonate solvent, a cyclic ether solvent, a chain ether solvent, a cyclic ester solvent, a chain ester solvent, and a fluorine solvent. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. The above nonaqueous solvents may be used alone or in a mixture of two or more.

The nonaqueous electrolyte solution may include at least one fluorine solvent selected from the group consisting of fluoroethylene carbonate, methyl fluoropropionate, fluorobenzene, fluoroethyl methyl carbonate, and fluorodimethylene carbonate. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The above lithium salts may be used alone or in a mixture of two or more. The concentration of the lithium salt in the nonaqueous electrolyte solution is, for example, 0.5 to 2 mol/liter.

The gel electrolyte may be a polymer material impregnated with a nonaqueous electrolyte solution. Examples of the polymer material include polyethylene oxide, polyacrylonitrile, polyvinylidene fluoride, polymethyl methacrylate, and a polymer including an ethylene oxide bond.

The ionic liquid may be composed of a cation. Examples of the cation include aliphatic chain quaternary salts, such as tetraalkylammonium and tetraalkylphosphonium; aliphatic cyclic ammonium salts, such as pyrrolidinium salts, morpholinium salts, imidazolinium salts, tetrahydropyrimidinium salts, piperazinium salts, and piperidinium salts; and nitrogen-containing heterocyclic aromatic cations, such as pyridinium salts and imidazolium salts. The ionic liquid may be composed of an anion. Examples of the anion include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may include a lithium salt.

At least one selected from the positive electrode 51, the electrolyte layer 52, and the negative electrode 53 may include a binder in order to increase the adhesion between the particles. Examples of the binder include polyvinylidene fluoride, polytetrafluoroethylene, polyethylene, polypropylene, an aramid resin, polyimide, polyimide, polyimide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyethersulfone, hexafluoropolypropylene, styrene butadiene rubber, and carboxymethyl cellulose. The binder may be a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above materials may also be used as a binder.

The shape of the battery 50 is not limited. The battery 50 may have various shapes, such as a coin-like shape, a cylindrical shape, a rectangular shape, a sheet-like shape, a button-like shape, a flat shape, or a multilayer shape.

In the battery 50 according to Embodiment 5, the positive electrode 51 includes the electrode material 40. At least one selected from the positive electrode 51 and the negative electrode 53 may include the electrode material 40. Adding the electrode material 40 to the positive electrode 51 and/or the negative electrode 53 may reduce the retention of metal ions due to a sudden change in the transfer rate of metal ions and limit increases in the concentrations of metal ions at the interfaces between the layers constituting the electrode material 40. Consequently, the charge/discharge efficiency of the battery 50 may be increased.

For example, in the case where the electrode active material particle 41 is a particle of a positive electrode active material, when the battery 50 is discharged, a reduction in potential caused as a result of increases in metal ion concentration at the interfaces between the layers constituting the electrode material 40 may be limited. Accordingly, the likelihood of discharge of the battery being terminated at an early stage as a result of the reduction in potential may be reduced. This allows the battery 50 to be discharged to a sufficient degree and increases the charge/discharge efficiency of the battery 50.

EXAMPLES

Example 1

Preparation of Sulfide Solid Electrolyte Material

A $Li_2S$ powder and a $P_2S_5$ powder were weighed such that the molar ratio of the $Li_2S$ powder to the $P_2S_5$ powder was $Li_2S:P_2S_5=80:20$ in an argon-filled glovebox containing an Ar atmosphere having a dew point of −60° C. or less. The above powders were charged into a mortar and subsequently pulverized and mixed with each other. The resulting mixture was milled with a planetary ball mill at 510 rpm for 10 hours to form a glassy solid electrolyte. The glassy solid electrolyte was heated at 270° C. for 2 hours in an inert atmosphere. Hereby, a $Li_2S$—$P_2S_5$ powder that was a glass-ceramic solid electrolyte was prepared.

In an electric furnace, 300 mg of the $Li_2S$—$P_2S_5$ powder and 5.4 mg of a $KMnO_4$ powder were placed such that the $Li_2S$—$P_2S_5$ powder and the $KMnO_4$ powder do not come into direct contact with each other. Subsequently, the powders were heated at 350° C. for 12 hours. Consequently, an oxide layer was formed on the surfaces of the $Li_2S$—$P_2S_5$ powder particles. Hereby, a powder of a sulfide solid electrolyte material of Example 1 was prepared. The $KMnO_4$ powder served as an oxidizing agent.

Preparation of Positive Electrode Mixture

A powder of the sulfide solid electrolyte material prepared in Example 1 and a $Li(NiCoAl)O_2$ powder used as a positive electrode active material were weighed in the argon-filled glovebox such that the weight ratio of the powder of the sulfide solid electrolyte material to the $Li(NiCoAl)O_2$ powder was 30:70. The above powders were charged into an agate mortar and mixed with each other. Hereby, a positive electrode mixture of Example 1 was prepared. Hereinafter, Li(NiCoAl)O$_2$ is abbreviated as "NCA".

Example 2

A powder of a sulfide solid electrolyte material of Example 2 and a positive electrode mixture of Example 2 were prepared as in Example 1, except that the amount of KMnO$_4$ powder used was changed to 7.2 mg.

Example 3

A powder of a sulfide solid electrolyte material of Example 3 and a positive electrode mixture of Example 3 were prepared as in Example 1, except that the amount of KMnO$_4$ powder used was changed to 8.4 mg.

Example 4

A powder of a sulfide solid electrolyte material of Example 4 and a positive electrode mixture of Example 4 were prepared as in Example 1, except that the amount of KMnO$_4$ powder used was changed to 15.0 mg and the Li$_2$S—P$_2$S$_5$ powder was heated at 350° C. for 3 hours.

Example 5

A powder of a sulfide solid electrolyte material of Example 5 and a positive electrode mixture of Example 5 were prepared as in Example 1, except that the amount of KMnO$_4$ powder used was changed to 15.0 mg.

Example 6

A powder of a sulfide solid electrolyte material of Example 6 and a positive electrode mixture of Example 6 were prepared as in Example 1, except that the amount of KMnO$_4$ powder used was changed to 30.0 mg.

Example 7

A powder of a sulfide solid electrolyte material of Example 7 and a positive electrode mixture of Example 7 were prepared as in Example 1, except that the amount of KMnO$_4$ powder used was changed to 36.0 mg.

Example 8

A powder of a sulfide solid electrolyte material of Example 8 and a positive electrode mixture of Example 8 were prepared as in Example 1, except that the amount of KMnO$_4$ powder used was changed to 21.0 mg.

Example 9

A powder of a sulfide solid electrolyte material of Example 9 was prepared as in Example 1, except that the amount of KMnO$_4$ powder used was changed to 15.0 mg.

A powder of the sulfide solid electrolyte material prepared in Example 9 and a LiCoO$_2$ powder used as a positive electrode active material were weighed in the argon-filled glovebox such that the weight ratio of the powder of the sulfide solid electrolyte material to the LiCoO$_2$ powder was 30:70. The above powders were charged into an agate mortar and mixed with each other. Hereby, a positive electrode mixture of Example 9 was prepared. Hereinafter, LiCoO$_2$ is abbreviated as "LCO".

Example 10

A Li$_2$S powder, a P$_2$S$_5$ powder, and a Li$_2$O powder were weighed such that the molar ratio between the Li$_2$S powder, the P$_2$S$_5$ powder, and the Li$_2$O powder was Li$_2$S:P$_2$S$_5$:Li$_2$O=56:24:20 in an argon-filled glovebox containing an Ar atmosphere having a dew point of −60° C. or less. The Li$_2$S powder and the P$_2$S$_5$ powder were charged into a mortar and subsequently pulverized and mixed with each other. The resulting mixture was milled with a planetary ball mill at 370 rpm for 20 hours. Subsequently, the Li$_2$O powder was added to the ball mill, and the resulting mixture was milled at 370 rpm for another 40 hours to form a glassy solid electrolyte.

In an electric furnace, 300 mg of the glassy solid electrolyte and 60.0 mg of a KMnO$_4$ powder were placed. Subsequently, heating was performed at 350° C. for 12 hours. Consequently, an oxide layer was formed on the surfaces of the solid electrolyte powder particles. Hereby, a powder of a sulfide solid electrolyte material of Example 10 was prepared.

A positive electrode mixture of Example 10 was prepared as in Example 1, except that a powder of the sulfide solid electrolyte material prepared in Example 10 was used instead of a powder of the sulfide solid electrolyte material prepared in Example 1.

Example 11

A Li$_2$S—P$_2$S$_5$ powder was prepared as in Example 1, except that the Li$_2$S powder and the P$_2$S$_5$ powder were weighed such that the molar ratio of the Li$_2$S powder to the P$_2$S$_5$ powder was Li$_2$S:P$_2$S$_5$=75:25.

In an electric furnace, 300 mg of the Li$_2$S—P$_2$S$_5$ powder and 15.0 mg of a KMnO$_4$ powder were placed. The powders were heated at 350° C. for 12 hours. Consequently, an oxide layer was formed on the surfaces of the Li$_2$S—P$_2$S$_5$ powder particles. Hereby, a powder of a sulfide solid electrolyte material of Example 11 was prepared.

A positive electrode mixture of Example 11 was prepared as in Example 1, except that a powder of the sulfide solid electrolyte material prepared in Example 11 was used instead of a powder of the sulfide solid electrolyte material prepared in Example 1.

Example 12

In an argon-filled glovebox containing an Ar atmosphere having a dew point of −60° C. or less, 500 mg of a powder of the glass ceramic solid electrolyte Li$_2$S—P$_2$S$_5$ (molar ratio: Li$_2$S:P$_2$S$_5$=75:25) prepared in Example 11 was weighed. The Li$_2$S—P$_2$S$_5$ powder was charged into an airtight container. After the inside of the airtight container had been vacuumed, 28 cc of an oxygen gas was introduced into the airtight container. The airtight container was then placed into an electric furnace in order to heat the Li$_2$S—P$_2$S$_5$ powder at 300° C. for 40 minutes. Consequently, an oxide layer was formed on the surfaces of the Li$_2$S—P$_2$S$_5$ powder particles. Hereby, a powder of a sulfide solid electrolyte material of Example 12 was prepared.

A positive electrode mixture of Example 12 was prepared as in Example 1, except that a powder of the sulfide solid electrolyte material prepared in Example 12 was used instead of a powder of the sulfide solid electrolyte material prepared in Example 1.

Example 13

A powder of a sulfide solid electrolyte material of Example 13 and a positive electrode mixture of Example 13 were prepared as in Example 1, except that the amount of KMnO₄ powder used was changed to 4.2 mg.

Example 14

A powder of the sulfide solid electrolyte material prepared in Example 8 and an acetylene black powder were weighed in the argon-filled glovebox such that the weight ratio of the powder of the sulfide solid electrolyte material to the acetylene black powder was 30:2. The above powders were charged into an agate mortar and mixed with each other. Hereby, an electrode mixture of Example 14 was prepared. Acetylene black served as a conductive additive.

Example 15

A powder of the sulfide solid electrolyte material prepared in Example 8, a NCA powder, and an acetylene black powder were weighed in the argon-filled glovebox such that the weight ratio between the powder of the sulfide solid electrolyte material, the NCA powder, and the acetylene black powder was 30:70:2. The above powders were charged into an agate mortar and mixed with one another. Hereby, a positive electrode mixture of Example 15 was prepared.

Example 16

A positive electrode mixture of Example 16 was prepared as in Example 15, except that a powder of the sulfide solid electrolyte material prepared in Example 11 was used instead of a powder of the sulfide solid electrolyte material prepared in Example 8.

Example 17

Preparation of Coating Layer Covering Particles of Positive Electrode Active Material In the argon-filled glovebox, 0.06 mg of metal Li produced by The Honjo Chemical Corporation and 2.87 mg of pentaethoxyniobium produced by Kojundo Chemical Lab. Co., Ltd. were dissolved in 0.2 mL of super dehydrated ethanol produced by Wako Pure Chemical Industries, Ltd. to form a coating solution.

Into an agate mortar, 100 mg of a NCA powder was charged. While the coating solution was gradually added to the agate mortar, a mixture of the NCA powder and the coating solution was stirred. After the whole amount of coating solution had been added to the agate mortar, the mixture was stirred on a hot plate heated at 30° C. until the drying and solidification of the mixture were visually confirmed.

The powder produced by drying and solidifying the mixture was charged into an alumina crucible and exposed to an air atmosphere. The powder was heated at 300° C. for 1 hour in an air atmosphere. The powder that had been subjected to the above heat treatment was again pulverized in an agate mortar. Hereby, a powder of a positive electrode active material of Example 17 was prepared. The coating layer was composed of $LiNbO_3$.

Preparation of Positive Electrode Mixture

In the argon-filled glovebox, a powder of the sulfide solid electrolyte material prepared in Example 11 and a powder of the positive electrode active material prepared in Example 17 were weighed such that the weight ratio of the sulfide solid electrolyte material to the positive electrode active material was 30:70. The above powders were charged into an agate mortar and mixed with each other. Hereby, a positive electrode mixture of Example 17 was prepared.

Example 18

A positive electrode mixture of Example 18 was prepared as in Example 17, except that a powder of the sulfide solid electrolyte material prepared in Example 8 was used instead of a powder of the sulfide solid electrolyte material prepared in Example 11.

Example 19

A positive electrode mixture of Example 19 was prepared as in Example 17, except that a powder of the sulfide solid electrolyte material prepared in Example 5 was used instead of a powder of the sulfide solid electrolyte material prepared in Example 11.

Comparative Example 1

A powder of a sulfide solid electrolyte material of Comparative example 1 and a positive electrode mixture of Comparative example 1 were prepared as in Example 1, except that the KMnO₄ powder was not used in the heat treatment of the $Li_2S$—$P_2S_5$ powder.

Comparative Example 2

A $Li_2S$ powder, a $P_2S_5$ powder, and a $Li_2O$ powder were weighed such that the molar ratio between the $Li_2S$ powder, the $P_2S_5$ powder, and the $Li_2O$ powder was $Li_2S:P_2S_5:Li_2O=56:24:20$ in an argon-filled glovebox containing an Ar atmosphere having a dew point of −60° C. or less. The $Li_2S$ powder and the $P_2S_5$ powder were charged into a mortar and subsequently pulverized and mixed with each other. The resulting mixture was milled with a planetary ball mill at 370 rpm for 20 hours. Subsequently, the $Li_2O$ powder was added to the ball mill, and the resulting mixture was milled at 370 rpm for another 40 hours. Hereby, a powder of a sulfide solid electrolyte material of Comparative example 2 was prepared.

A positive electrode mixture of Comparative example 2 was prepared as in Example 1, except that a powder of the sulfide solid electrolyte material prepared in Comparative example 2 was used instead of a powder of the sulfide solid electrolyte material prepared in Example 1.

Comparative Example 3

A positive electrode mixture of Comparative example 3 was prepared as in Example 1, except that a powder of the sulfide solid electrolyte material prepared in Comparative example 1 was used instead of a powder of the sulfide solid electrolyte material prepared in Example 1 and a LCO powder was used instead of the NCA powder.

Comparative Example 4

A $Li_2S$—$P_2S_5$ powder was prepared as in Example 1, except that the $Li_2S$ powder and the $P_2S_5$ powder were weighed such that the molar ratio of the $Li_2S$ powder to the $P_2S_5$ powder was $Li_2S:P_2S_5=75:25$. A positive electrode mixture of Comparative example 4 was prepared as in Example 1, except that the above $Li_2S$—$P_2S_5$ powder was used as a powder of a sulfide solid electrolyte material of Comparative example 4, instead of a powder of the sulfide solid electrolyte material prepared in Example 1.

Comparative Example 5

A powder of the sulfide solid electrolyte material prepared in Comparative Example 1 and an acetylene black powder were weighed in the argon-filled glovebox such that the weight ratio of the powder of the sulfide solid electrolyte material to the acetylene black powder was 30:2. The above powders were charged into an agate mortar and mixed with each other. Hereby, an electrode mixture of Comparative example 5 was prepared.

Comparative Example 6

A positive electrode mixture of Comparative example 6 was prepared as in Example 15, except that a powder of the sulfide solid electrolyte material prepared in Comparative example 1 was used instead of a powder of the sulfide solid electrolyte material prepared in Example 8.

Comparative Example 7

A positive electrode mixture of Comparative example 7 was prepared as in Example 17, except that a powder of the sulfide solid electrolyte material prepared in Comparative example 1 was used instead of a powder of the sulfide solid electrolyte material prepared in Example 11 and a NCA powder that did not include a coating layer was used as a powder of a positive electrode active material.

Comparative Example 8

A positive electrode mixture of Comparative example 8 was prepared as in Example 17, except that a powder of the sulfide solid electrolyte material prepared in Comparative example 1 was used instead of a powder of the sulfide solid electrolyte material prepared in Example 11.

Example 20

A positive electrode mixture of Example 20 was prepared as in Example 17, except that a NCA powder that did not include a coating layer was used as a powder of a positive electrode active material.

Example 21

A positive electrode mixture of Example 21 was prepared as in Example 18, except that a NCA powder that did not include a coating layer was used as a powder of a positive electrode active material.

Example 22

A positive electrode mixture of Example 22 was prepared as in Example 19, except that a NCA powder that did not include a coating layer was used as a powder of a positive electrode active material.

Measurement of Oxygen/Lithium Element Ratio

An XPS analysis of each of the sulfide solid electrolyte materials prepared in Examples 1 to 13 and Comparative examples 1 to 7 was conducted in accordance with the method described in Embodiment 1. A $C_{60}$ cluster ion beam was used for performing sputtering. Each of the sulfide solid electrolyte materials was irradiated with a $C_{60}$ cluster ion beam and thereby etched to a depth 4 nm (in terms of $SiO_2$ sputtering rate) from the surface of the sulfide solid electrolyte material and subsequently subjected to the XPS analysis. The oxygen/lithium element ratio x at the 4-nm depth position was determined on the basis of the results of the XPS analysis. Each of the sulfide solid electrolyte materials was further etched to a depth 100 nm from the surface of the sulfide solid electrolyte material and then subjected to the XPS analysis. The oxygen/lithium element ratio y at the 100-nm depth position was determined on the basis of the results of the XPS analysis. Table 1 shows the results. The XPS analysis was conducted under the following conditions:

Equipment: "PHI VersaProbe" produced by ULVAC-PHI, Incorporated.

X-ray source: Monochromatic AlKα radiation (1486.6 eV)

Sputtering conditions: $C_{60}^+$, 10.0 kV

Sputtering rate: About 2 nm/min (in terms of $SiO_2$)

Preparation of Secondary Batteries

Secondary batteries were each prepared using a specific one of the positive electrode mixtures prepared in Examples 1 to 13, Examples 15 to 22, Comparative examples 1 to 4, and Comparative examples 6 to 8 by the following method.

Into an insulative external cylinder, 80 mg of a $Li_2S$—$P_2S_5$ powder and 10 mg of a specific one of the positive electrode mixtures were charged in this order so as to form a $Li_2S$—$P_2S_5$ layer and a layer composed of the positive electrode mixture that were stacked on top of each other. The above layers were pressed at a pressure of 360 MPa to form a positive electrode and a solid-electrolyte layer.

A layer composed of metal In (thickness: 200 μm) was stacked on the solid-electrolyte layer. The above layers were pressed at a pressure of 80 MPa to form a multilayer body including a positive electrode, a solid-electrolyte layer, and a negative electrode. A current collector made of stainless steel was disposed on the upper and lower surfaces of the multilayer body. A current collection lead was attached to each of the current collectors. Then, the insulative external cylinder was hermetically sealed with an insulative ferrule. Hereby, a secondary battery was prepared.

Charge/Discharge Test

Each of the batteries of Examples 1 to 13 and Comparative examples 1 to 4 was subjected to the following charge/discharge test. The battery was placed in a thermostat kept at 25° C. The battery was charged at a constant current of 70 μA, which corresponded to 0.05C rate (i.e., 20-hour discharge rate) relative to the theoretical capacity of the battery. The charge of the battery was terminated when the voltage of the battery was 3.7 V. Subsequently, the battery was discharged at a current of 70 μA. The discharge of the battery was terminated when the voltage of the battery was 1.9 V. Table 1 shows the discharge capacities (mAh/g) of the batteries of Examples 1 to 13 and Comparative examples 1 to 4.

TABLE 1

| | Positive electrode active material | O/Li ratio x | O/Li ratio y | x/y | Discharge capacity (mAh/g) |
|---|---|---|---|---|---|
| Example 1 | NCA | 0.65 | 0.27 | 2.36 | 134.71 |
| Example 2 | NCA | 0.66 | 0.30 | 2.20 | 139.12 |
| Example 3 | NCA | 0.78 | 0.29 | 2.73 | 139.46 |
| Example 4 | NCA | 0.95 | 0.49 | 1.93 | 145.99 |
| Example 5 | NCA | 0.88 | 0.31 | 2.84 | 152.01 |
| Example 6 | NCA | 0.91 | 0.50 | 1.82 | 140.72 |

TABLE 1-continued

|  | Positive electrode active material | O/Li ratio x | O/Li ratio y | x/y | Discharge capacity (mAh/g) |
|---|---|---|---|---|---|
| Example 7 | NCA | 1.00 | 0.50 | 1.99 | 143.66 |
| Example 8 | NCA | 1.02 | 0.40 | 2.55 | 147.00 |
| Example 9 | LCO | 0.88 | 0.31 | 2.84 | 100.09 |
| Example 10 | NCA | 1.07 | 0.53 | 2.02 | 147.43 |
| Example 11 | NCA | 0.70 | 0.24 | 2.87 | 140.21 |
| Example 12 | NCA | 1.24 | 0.81 | 1.53 | 150.98 |
| Example 13 | NCA | 0.51 | 0.18 | 2.78 | 129.44 |
| Comparative example 1 | NCA | 0.25 | 0.23 | 1.09 | 114.72 |
| Comparative example 2 | NCA | 0.28 | 0.25 | 1.11 | 121.71 |
| Comparative example 3 | LCO | 0.25 | 0.23 | 1.09 | 78.80 |
| Comparative example 4 | NCA | 0.17 | 0.13 | 1.33 | 111.41 |

Each of the batteries of Examples 15 and 16 and Comparative example 6 was subjected to the following charge/discharge test. The battery was placed in a thermostat kept at 25° C. The battery was charged at a constant current of 68.6 μA, which corresponded to 0.05C rate (i.e., 20-hour discharge rate) relative to the theoretical capacity of the battery. The charge of the battery was terminated when the voltage of the battery was 3.7 V. Subsequently, the battery was discharged at a current of 68.6 μA. The discharge of the battery was terminated when the voltage of the battery was 1.9 V. The charge capacity and discharge capacity of each of the batteries of Examples 15 and 16 and Comparative example 6 were measured. The charge/discharge efficiency of each of the batteries of Examples 15 and 16 and Comparative example 6 was calculated. Note that, initial charge/discharge efficiency is the ratio of initial discharge capacity to initial charge capacity.

The difference in charge capacity between the battery of Example 15 and the battery of Example 8 was calculated. The difference in charge/discharge efficiency between the battery of Example 15 and the battery of Example 8 was calculated. The above differences were determined by subtracting the charge capacity or charge/discharge efficiency of the battery of Example 8 from that of the battery of Example 15. The difference in charge capacity between the battery of Example 16 and the battery of Example 11 was calculated. The difference in charge/discharge efficiency between the battery of Example 16 and the battery of Example 11 was calculated. The above differences were determined by subtracting the charge capacity or charge/discharge efficiency of the battery of Example 11 from that of the battery of Example 16. The difference in charge capacity between the battery of Comparative example 6 and the battery of Comparative example 1 was calculated. The difference in charge/discharge efficiency between the battery of Comparative example 6 and the battery of Comparative example 1 was calculated. The above differences were determined by subtracting the charge capacity or charge/discharge efficiency of the battery of Comparative example 1 from that of the battery of Comparative example 6. Table 2 shows the results.

The batteries of Examples 15 and 16 and Comparative example 6 included acetylene black, that is, a conductive additive, while the batteries of Examples 8 and 11 and Comparative example 1 did not include acetylene black. The batteries of Examples 15 and 16 and Comparative example 6 had the same structure as the batteries of Examples 8 and 11 and Comparative example 1, respectively, except for the presence of acetylene black.

TABLE 2

|  | Target for difference calculation | Difference in charge capacity (mAh/g) | Difference in charge/discharge efficiency (%) |
|---|---|---|---|
| Example 15 | Example 8 | +17.5 | −3.39 |
| Example 16 | Example 11 | +37.1 | −4.21 |
| Comparative example 6 | Comparative example 1 | +10.2 | −7.91 |

Figure 12:
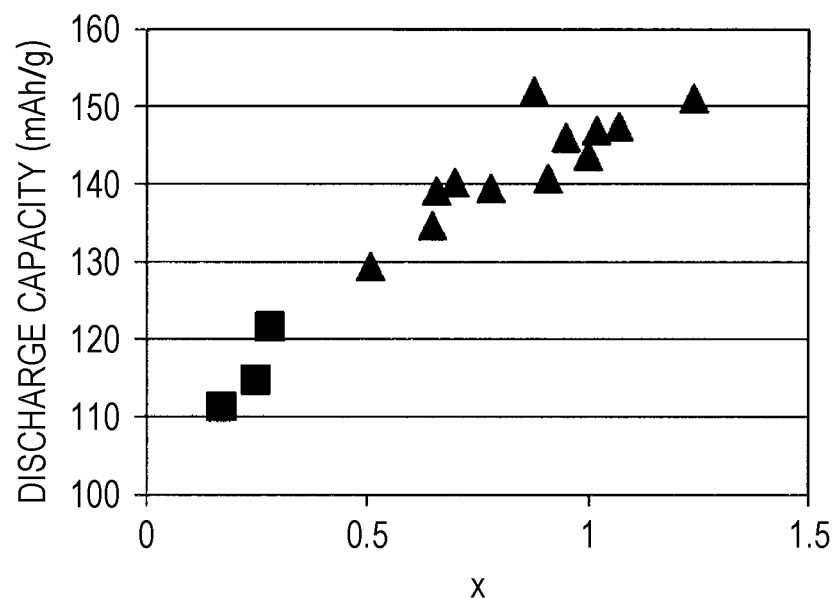
FIG. 12 is a graph illustrating the relationship between the oxygen/lithium element ratio x and discharge capacity.
Figure 13:
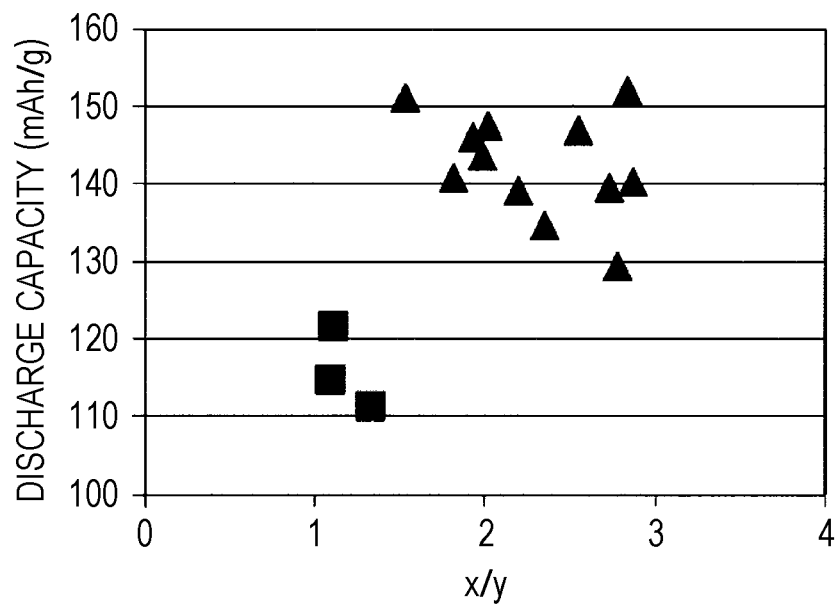
FIG. 13 is a graph illustrating the relationship between the ratio x/y and discharge capacity.

FIG. 12 is a graph illustrating the relationship between the oxygen/lithium element ratio x and discharge capacity in Examples 1 to 8 and 10 to 13 and Comparative examples 1, 2, and 4. FIG. 13 is a graph illustrating the relationship between the ratio x/y and discharge capacity in Examples 1 to 8 and 10 to 13 and Comparative examples 1, 2, and 4. In FIGS. 12 and 13, the triangular dots represent the data of Examples, while the rectangular dots represent the data of Comparative examples.

The results illustrated in FIGS. 12 and 13 confirm that a large discharge capacity of 125 mAh/g or more was achieved when the sulfide solid electrolyte material satisfied 0.51≤x and x/y≥1.53. The results obtained in Examples 4 to 8, 10, and 12 confirm that a markedly large discharge capacity of 140 mAh/g or more was achieved when the sulfide solid electrolyte material satisfied 0.88≤x.

The results obtained in Comparative examples 1, 2, and 4 confirm that a discharge capacity of 125 mAh/g was not achieved when the sulfide solid electrolyte material satisfied x<0.51 and x/y<1.53.

The results obtained in Comparative example 2 confirm that a discharge capacity of 125 mAh/g was not achieved even when an oxygen source (Li$_2$O) was dispersed in the sulfide solid electrolyte material by performing a milling treatment with a ball mill.

The results obtained in Example 10 and Comparative example 2 confirm that forming an oxide layer on the surface of the sulfide layer by performing an oxidation treatment using KMnO$_4$ enabled a markedly large discharge capacity of 140 mAh/g or more.

The results obtained in Example 9 and Comparative example 3 confirm that using LiCoO$_2$ in combination with the sulfide solid electrolyte material according to the present disclosure enhanced the discharge characteristic of the battery.

The results obtained in Example 11 and Comparative example 4 confirm that a markedly large discharge capacity of 140 mAh/g or more was achieved even when the molar ratio of Li$_2$S to P$_2$S$_5$ was 75:25. In other words, the molar ratio of Li$_2$S to P$_2$S$_5$ used in the preparation of the sulfide solid electrolyte material is not limited to 80:20. The technologies of the present disclosure may be applied to sulfide solid electrolyte materials having various structures and various compositions in order to increase the discharge capacity of a battery.

The results obtained in Example 12 confirm that a markedly large discharge capacity of 140 mAh/g or more was achieved even when an oxide layer was formed on the surface of the sulfide layer by an oxidation treatment using an oxygen gas.

The results obtained in Examples 15 and 16 confirm that adding a conductive additive to the positive electrode increased the charge capacity of the battery. Furthermore, the reduction in charge/discharge efficiency was limited to be 5% or less.

The results obtained in Comparative example 6 confirm that, in Comparative example 6, adding a conductive additive to the positive electrode increased the charge capacity of the battery but reduced the charge/discharge efficiency of the battery by 5% or more. One of the reasons for this is presumably that, in Comparative example 6, the oxidation reaction of the sulfide solid electrolyte material was not suppressed by a sufficient degree.

Electric Stability Evaluation

Electrochemical cells for electric stability evaluation were each prepared using a specific one of the electrode mixtures prepared in Example 14 and Comparative example 5 by the following method.

First, 80 mg of a $Li_2S$—$P_2S_5$ powder and 10 mg of the electrode mixture were charged into an insulative external cylinder in this order so as to form a $Li_2S$—$P_2S_5$ layer and a layer composed of the mixture which were stacked on top of each other. The above layers were pressed at a pressure of 360 MPa to form an electrode mixture layer and a solid-electrolyte layer.

A layer composed of metal Li (thickness: 300 μm) was stacked on the solid-electrolyte layer. The above layers were pressed at a pressure of 20 MPa to form a multilayer body including a mixture layer, a solid-electrolyte layer, and a metal Li layer. A current collector made of stainless steel was disposed on the upper and lower surfaces of the multilayer body. A current collection lead was attached to each of the current collectors. Then, the insulative external cylinder was hermetically sealed with an insulative ferrule. Hereby, an electrochemical cell was prepared.

Figure 14:
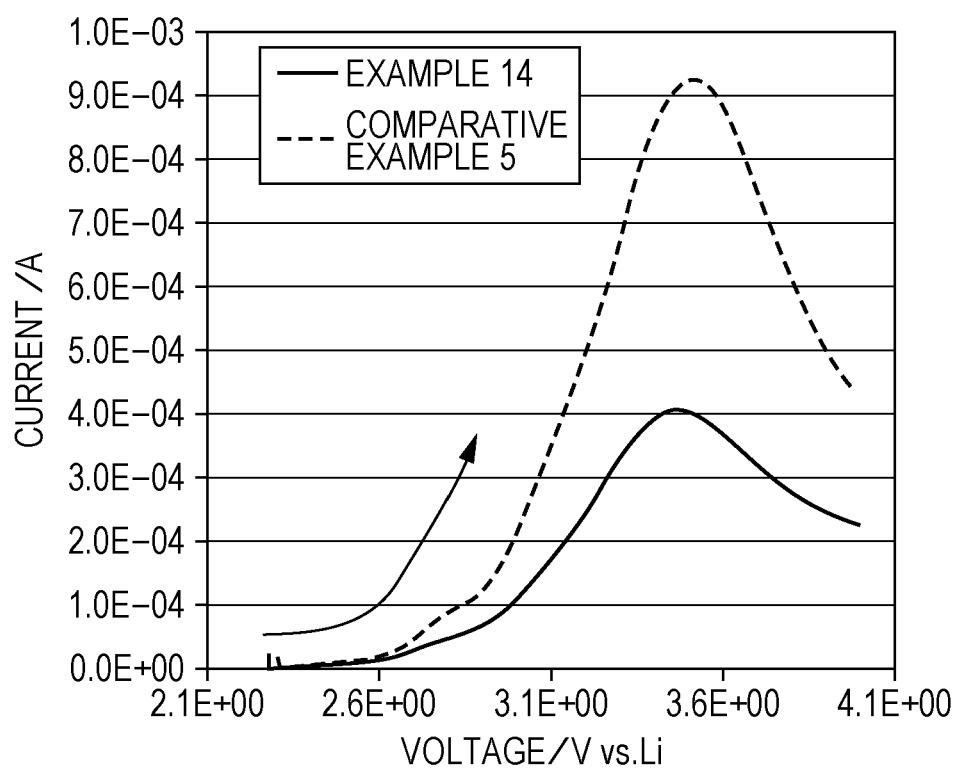
FIG. 14 is a graph illustrating the results of linear sweep voltammetry in Example 14 and Comparative example 5.

Each of the electrochemical cells was placed in a thermostat kept at 25° C. and subjected to the following linear sweep voltammetry test. Specifically, the potential was swept from the open-circuit voltage of the electrochemical cell in the noble-potential direction at a rate of 1 mV/sec. FIG. 14 illustrates the results.

In Comparative example 5, the occurrence of an oxidation current peak of $9.2 \times 10^{-4}$ A resulting from the oxidation reaction of the sulfide solid electrolyte material was confirmed at 3.5 V vs. Li.

In Example 14, the occurrence of an oxidation current peak of $4.0 \times 10^{-4}$ A was confirmed at 3.5 V vs. Li. In the electrochemical cell of Example 14, the oxidation reaction of the sulfide solid electrolyte material was markedly suppressed compared with the electrochemical cell of Comparative example 5.

Measurement of Initial Charge/Discharge Efficiency

The batteries of Examples 17 to 22 and Comparative examples 7 and 8 were each subjected to the following charge/discharge test. The battery was placed in a thermostat kept at 25° C. The battery was charged at a constant current of 70 μA, which corresponded to 0.05C rate (i.e., 20-hour discharge rate) relative to the theoretical capacity of the battery. The charge of the battery was terminated when the voltage of the battery was 3.7 V. Subsequently, the battery was discharged at a current of 70 μA. The discharge of the battery was terminated when the voltage of the battery was 1.9 V. The charge capacity and discharge capacity of each of the batteries of Examples 17 to 22 and Comparative examples 7 and 8 were measured, and the initial charge/discharge efficiencies of the batteries were calculated. Table 3 shows the results.

TABLE 3

|  | Presence of coating layer | O/Li ratio x | O/Li ratio y | x/y | Initial charge/discharge efficiency (%) |
|---|---|---|---|---|---|
| Example 17 | Yes | 0.70 | 0.24 | 2.87 | 76.73 |
| Example 18 | Yes | 1.02 | 0.40 | 2.55 | 77.57 |
| Example 19 | Yes | 0.88 | 0.31 | 2.84 | 77.84 |
| Comparative example 7 | No | 0.25 | 0.23 | 1.09 | 65.17 |
| Comparative example 8 | Yes | 0.25 | 0.23 | 1.09 | 72.44 |
| Example 20 | No | 0.70 | 0.24 | 2.87 | 75.52 |
| Example 21 | No | 1.02 | 0.40 | 2.55 | 74.41 |
| Example 22 | No | 0.88 | 0.31 | 2.84 | 74.83 |

As shown in Table 3, the battery of Comparative example 7 had a low charge/discharge efficiency. One of the reasons for this is presumably that the sulfide solid electrolyte included in the battery of Comparative example 7 did not satisfy 0.51≤x and x/y≥1.53.

The battery of Comparative example 8 had a higher charge/discharge efficiency than that of Comparative example 7. One of the reasons for this is presumably that particles of the positive electrode active material included in the battery of Comparative example 8 were covered with a coating layer. Note that, the battery of Comparative example 8 had a lower charge/discharge efficiency than any of the batteries of Examples 17 to 22.

The batteries of Examples 20 to 22 had a higher charge/discharge efficiency than the battery of Comparative example 7. One of the reasons for this is presumably that the sulfide solid electrolytes included in the batteries of Examples 20 to 22 satisfied 0.51≤x and x/y≥1.53.

The batteries of Examples 17 to 19 had a higher charge/discharge efficiency than any of the batteries of Comparative example 8 and Examples 20 to 22. One of the reasons for this is presumably that the sulfide solid electrolytes included in the batteries of Examples 17 to 19 satisfied 0.51≤x and x/y≥1.53 and particles of the positive electrode active materials included in the batteries of Examples 17 to 19 were covered with a coating layer.

What is claimed is:

1. A solid electrolyte material comprising:
    a sulfide layer containing lithium atoms and sulfur atoms; and
    an oxide layer covering the sulfide layer, the oxide layer containing lithium atoms and oxygen atoms,
    wherein x and y satisfy 0.51≤x≤1.24 and 1.53≤x/y≤2.87, where x is a first ratio of a number of the oxygen atoms to a number of the lithium atoms at a depth 4 nm of the solid electrolyte material from a surface of the oxide layer, which is determined by an XPS analysis; and y is a second ratio of a number of the oxygen atoms to a number of the lithium atoms at a depth 100 nm of the solid electrolyte material from the surface of the oxide layer, which is determined by the XPS analysis.
2. The solid electrolyte material according to claim 1, wherein the oxide layer containing all of elements constituting the sulfide layer.
3. The solid electrolyte material according to claim 1, wherein 0.88≤x≤1.24.
4. The solid electrolyte material according to claim 1, wherein the sulfide layer and the oxide layer each contain phosphorus.
5. The solid electrolyte material according to claim 1, wherein the sulfide layer contains $Li_2S$—$P_2S_5$.

6. The solid electrolyte material according to claim 1, wherein $0 \leq y \leq 1.0$.

7. A battery comprising:
a positive electrode;
a negative electrode; and
an electrolyte layer disposed between the positive electrode and the negative electrode,
wherein at least one selected from the positive electrode, the negative electrode, and the electrolyte layer includes the solid electrolyte material according to claim 1.

8. The battery according to claim 7,
wherein at least one selected from the positive electrode and the negative electrode includes the solid electrolyte material.

9. The battery according to claim 7,
wherein the positive electrode includes the solid electrolyte material and a positive electrode active material.

10. The battery according to claim 9,
wherein the positive electrode active material contains at least one selected from lithium-nickel-cobalt-aluminum oxide and lithium-cobalt oxide.

11. A positive electrode comprising:
the solid electrolyte material according to claim 1;
a positive electrode active material; and
a conductive additive.

12. The positive electrode according to claim 11,
wherein the conductive additive contains acetylene black.

13. A battery comprising:
the positive electrode according to claim 11;
a negative electrode; and
an electrolyte layer disposed between the positive electrode and the negative electrode.

14. An electrode material comprising:
the solid electrolyte material according to claim 1;
an electrode active material particle; and
a coating layer that covers a surface of the electrode active material particle.

15. The electrode material according to claim 14,
wherein the coating layer contains an oxide solid electrolyte.

16. The electrode material according to claim 14,
wherein the coating layer contains lithium-niobium oxide.

17. The electrode material according to claim 14,
wherein the electrode active material particle contains lithium-nickel-cobalt-aluminum oxide.

18. A battery comprising:
a positive electrode;
a negative electrode; and
an electrolyte layer disposed between the positive electrode and the negative electrode,
wherein at least one selected from the positive electrode and the negative electrode includes the electrode material according to claim 14.

19. The battery according to claim 18,
wherein the positive electrode includes the electrode material.

* * * * *